United States Patent
Zheng et al.

(10) Patent No.: US 12,484,979 B2
(45) Date of Patent: Dec. 2, 2025

(54) 2D IMAGE-GUIDED SURGICAL ROBOT SYSTEM

(71) Applicant: Tsinghua University, Beijing (CN)

(72) Inventors: Gangtie Zheng, Beijing (CN); Shijie Zhu, Beijing (CN); Yu Chen, Beijing (CN); Qizhong Li, Beijing (CN); Yongwei Pan, Beijing (CN); Zhe Zhao, Beijing (CN); Jiuzheng Deng, Beijing (CN); Jianjin Zhu, Beijing (CN); Dawei He, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 881 days.

(21) Appl. No.: 16/875,930

(22) Filed: May 15, 2020

(65) Prior Publication Data
US 2021/0128261 A1 May 6, 2021

(51) Int. Cl.
*A61B 34/30* (2016.01)
*A61B 34/00* (2016.01)
(Continued)

(52) U.S. Cl.
CPC ............. *A61B 34/37* (2016.02); *A61B 34/10* (2016.02); *A61B 34/20* (2016.02); *A61B 34/32* (2016.02);
(Continued)

(58) Field of Classification Search
CPC ...... A61B 2017/0092; A61B 2090/064; A61B 2090/376; A61B 2090/3966; A61B 34/37;
(Continued)

(56) References Cited

U.S. PATENT DOCUMENTS 7,008,373 B2 3/2006 Stoianovici et al.
8,046,054 B2 * 10/2011 Kim .................... A61B 6/4441
378/4

(Continued)

FOREIGN PATENT DOCUMENTS

CN 1424673 6/2003
CN 101327148 12/2008
(Continued)

OTHER PUBLICATIONS

Patriciu, Alexandru et al. "Motion-Based Robotic Instrument Targeting Under C-Arm Fluoroscopy, Medical Image Computing and Computer-Assisted Intervention", Oct. 11-14, 2000, Pittsburgh, PA, Lecture Notes in Computer Science, Springer-Verlag, vol. 1935, pp. 988-998.

(Continued)

*Primary Examiner* — Christopher L Cook
(74) *Attorney, Agent, or Firm* — LOZA & LOZA, LLP; Michael Fedrick

(57) ABSTRACT

A 2D image-guided surgical robot system for drilling operations includes surgical image acquisition equipment, robot positioning and drilling equipment, and a remote operation workstation. To perform a drilling operation, images of the surgery area are acquired with the image acquisition equipment and are registered to the robot, and a distortion correction is performed. A drilling path is assigned by a doctor through the GUI of the remote operation workstation, and the remote operation workstation calculates the robot motion quantity using a position-based method and moves the robot accordingly. Based on the relative position of the surgical tool and drilling path in the images, the remote operation workstation calculates a motion quantity using image feedback and controls the robot to make further fine adjustments to the drilling path. The robot then performs the (Continued)

drilling operation with an electric drill or holds a drill guide for doctors to perform the drilling manually.

7 Claims, 24 Drawing Sheets

(51) Int. Cl.
| | |
|---|---|
| *A61B 34/10* | (2016.01) |
| *A61B 34/20* | (2016.01) |
| *A61B 34/32* | (2016.01) |
| *A61B 34/35* | (2016.01) |
| *A61B 34/37* | (2016.01) |
| *A61B 90/00* | (2016.01) |

(52) U.S. Cl.
CPC .............. *A61B 34/35* (2016.02); *A61B 34/74* (2016.02); *A61B 90/36* (2016.02); *A61B 2034/104* (2016.02); *A61B 2034/107* (2016.02); *A61B 2090/376* (2016.02)

(58) Field of Classification Search
CPC ............ A61B 17/1703; A61B 17/1725; A61B 17/7233; A61B 2034/104; A61B 2034/107; A61B 2034/2059; A61B 2034/2065; A61B 34/10; A61B 34/20; A61B 34/25; A61B 34/30; A61B 34/32; A61B 34/35; A61B 34/74; A61B 90/11; A61B 90/36; G06T 5/006; G06T 2207/10116; G06T 2207/30008; G06T 7/70; G06T 7/73
See application file for complete search history.

(56) References Cited

U.S. PATENT DOCUMENTS

| | | | |
|---|---|---|---|
| 8,394,114 | B2 | 3/2013 | Schaller et al. |
| 8,992,580 | B2 | 3/2015 | Bar et al. |
| 9,498,231 | B2 | 11/2016 | Haider et al. |
| 9,872,733 | B2 | 1/2018 | Shoham et al. |
| 9,974,613 | B2 | 5/2018 | Kang et al. |
| 10,028,788 | B2 | 7/2018 | Kang |
| 2012/0294498 | A1* | 11/2012 | Popovic .............. A61B 1/0005 382/128 |
| 2012/0323233 | A1* | 12/2012 | Maguire .............. A61N 5/1084 606/33 |
| 2013/0073091 | A1 | 3/2013 | Setsuda |
| 2015/0085979 | A1* | 3/2015 | Zheng ................... G06T 5/006 378/207 |
| 2015/0112344 | A1* | 4/2015 | Shoham ................ A61B 34/70 606/64 |
| 2017/0007334 | A1* | 1/2017 | Crawford .............. A61B 90/98 |
| 2017/0042622 | A1 | 2/2017 | Yang et al. |
| 2019/0090966 | A1* | 3/2019 | Kang ................. A61B 17/1671 |
| 2019/0122330 | A1* | 4/2019 | Saget .................... G06T 3/0081 |
| 2019/0290365 | A1* | 9/2019 | Gao ..................... A61B 90/39 |
| 2020/0352659 | A1 | 11/2020 | Zastrozna |

FOREIGN PATENT DOCUMENTS

| | | |
|---|---|---|
| CN | 105395240 | 3/2016 |
| CN | 108392271 | 8/2018 |
| CN | 108601669 | 9/2018 |
| CN | 108938090 | 12/2018 |
| CN | 110123456 | 8/2019 |
| CN | 110141363 | 8/2019 |
| CN | 110197461 | 9/2019 |
| CN | 110236674 | 9/2019 |
| CN | 209392096 | 9/2019 |
| CN | 110325141 | 10/2019 |
| CN | 110709026 | 1/2020 |
| CN | 111297479 | 6/2020 |
| CN | 112006777 | 12/2020 |
| CN | 112869856 | 6/2021 |
| WO | 2019139841 | 7/2019 |

OTHER PUBLICATIONS

Lefranc, M. et al. "Evaluation of the ROSA Spine robot for minimally invasive surgical procedures", Expert Review of Medical Devices, vol. 13, No. 10, Oct. 2016, pp. 899-906.
Khan, A. et al. "Next-Generation Robotic Spine Surgery: First Report on Feasibility, Safety, and Learning Curve," Operative neurosurgery (Hagerstown, Md.), 2019, vol. 17, No. 1, pp. 61-69.
François Chaumette, S. Hutchinson, Visual servo control, Part I: Basic approaches, IEEE Robotics and Automation Magazine, Institute of Electrical and Electronics Engineers, 2006, 13(4):82-90.

* cited by examiner

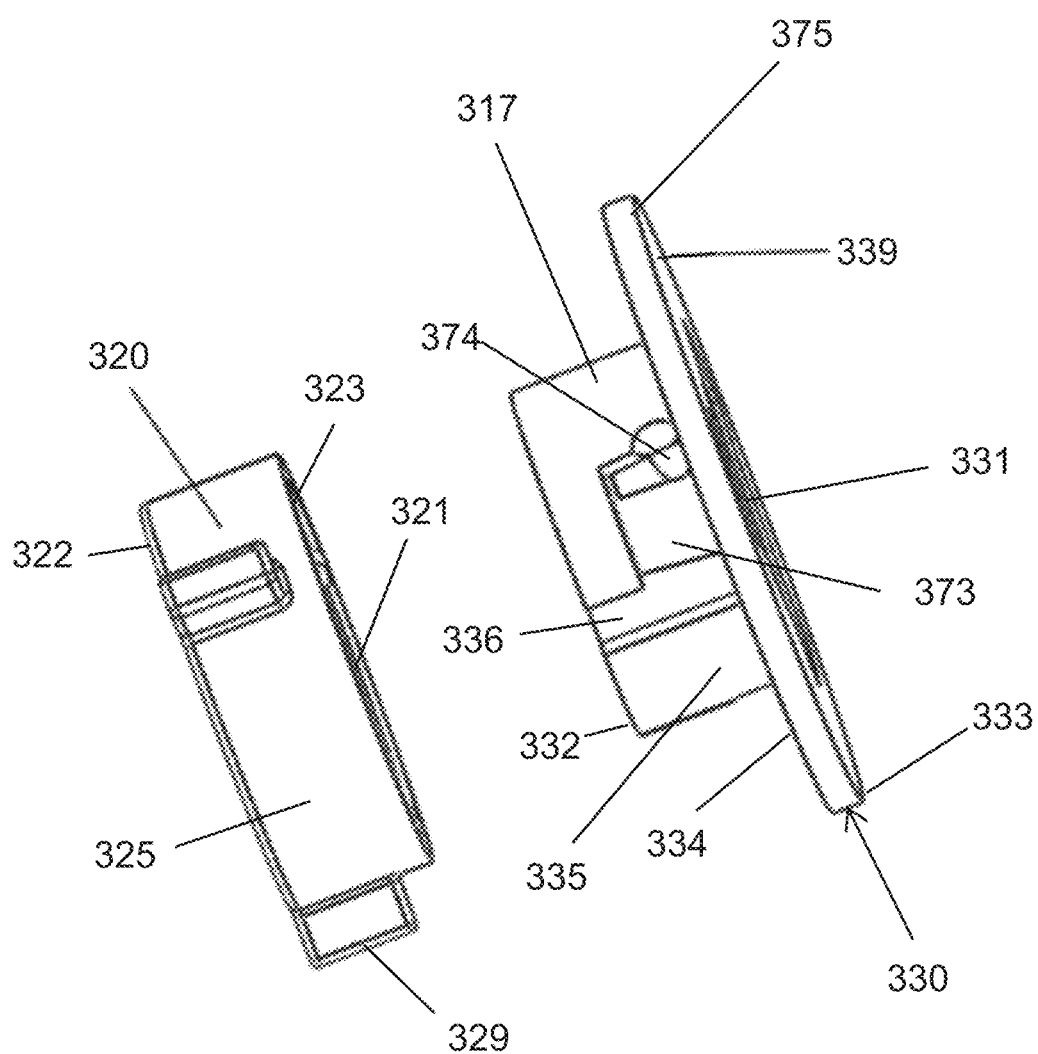

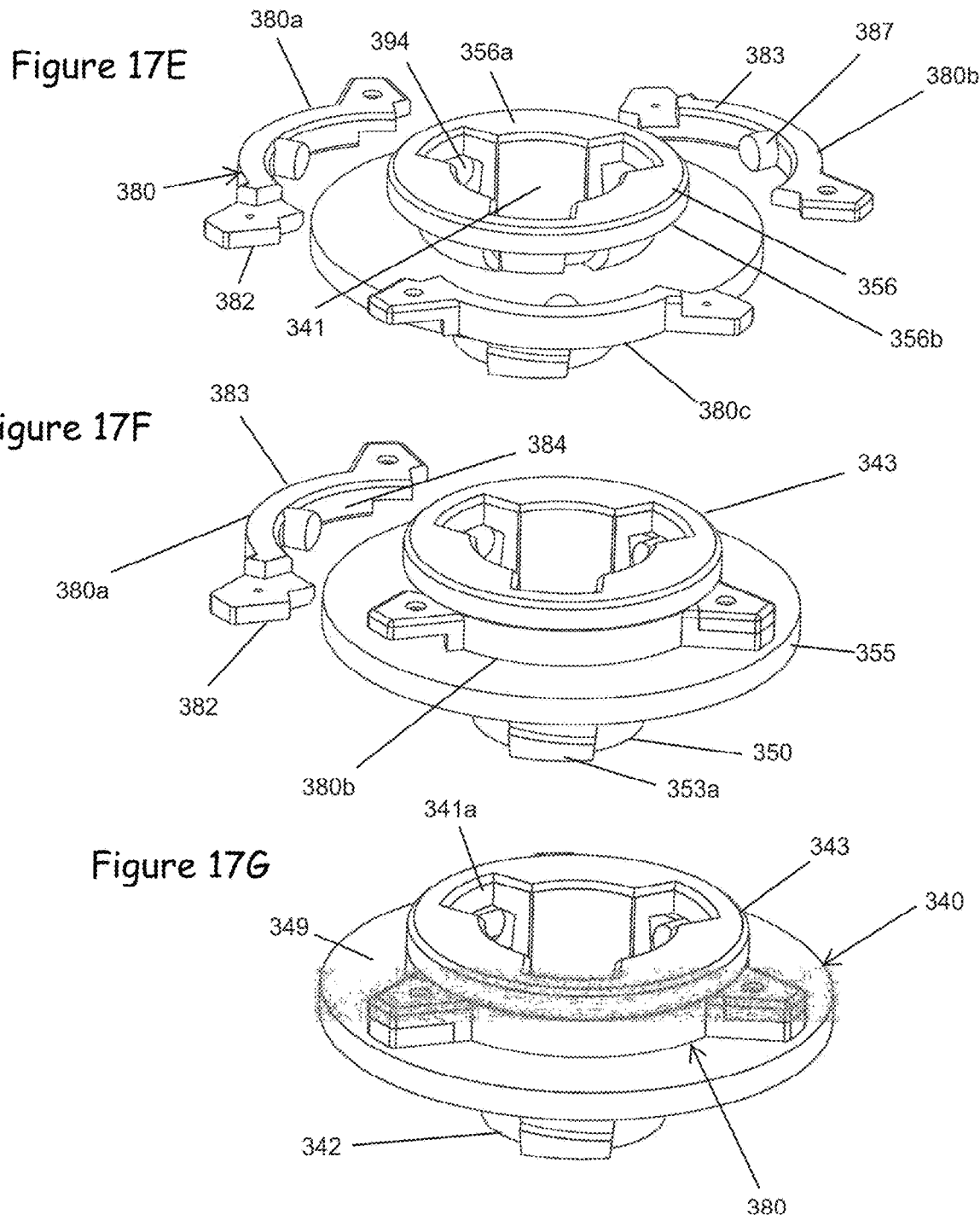

2D IMAGE-GUIDED SURGICAL ROBOT SYSTEM

INTRODUCTION/BACKGROUND

Precise drilling operation is a common requirement for orthopedic surgeries including pedicle screw placement for spinal surgeries, distal locking of intramedullary nails, and femoral neck screw placement for trauma surgeries. The accuracy of the drilling, including the entry point and the direction, directly influences the outcome of the surgery and improper drilling may cause a catastrophic result. To improve the accuracy of the drilling operation, robotic and computer technologies have been used and commercial products such as surgical navigation systems and surgical robots are now available.

Currently, most navigation systems or surgical robots for drilling tasks require optical tracking technology and pre-operative or intraoperative 3D image data for navigation, including systems described in U.S. Pat. Nos. 9,498,231, 8,992,580, 8,394,114, 9,974,613, and 10028788, as well as in the Mazor X system (A. Khan, J. E. Meyers, I. Siasios, and J. Pollina, "Next-Generation Robotic Spine Surgery: First Report on Feasibility, Safety, and Learning Curve," *Operative neurosurgery (Hagerstown, Md.)*, vol. 17, no. 1, pp. 61-69, 2019 Jul. 1, 2019) and the ROSA™ Spine system (M. Lefranc, and J. Peltier, "Evaluation of the ROSA Spine robot for minimally invasive surgical procedures," *Expert Review of Medical Devices*, vol. 13, no. 10, pp. 899-906, October, 2016). These navigation methods are based on absolute coordinates in physical space. In other words, the function of the navigation system is to acquire the position and the orientation of the surgery tools and the surgical site, described in the same absolute coordinate system. Then the surgeon or the surgical robot operates according to this position and orientation information.

Although systems currently available using the above navigation methods can achieve fairly high accuracy, they have drawbacks. First, necessary trackers mounted on the surgical tools and the patient's body lead to extra iatrogenic injuries to the patient and to additional surgery steps. Any unexpected shifting of these trackers during surgery may deteriorate the overall accuracy of the drilling operation. Compared to traditional surgery, the requirements for the optical tracking system and preoperative or intraoperative CT scans in such systems also means a significant increase in the cost of surgery. Most importantly, the procedure for setting up the absolute coordinates is not included in conventional surgeons' training and experience, and operating with such navigation systems is very different from conventional operations. In other words, surgeons have to adopt a different way of thinking than they are used to in order to perform such robot-assisted operations. All of these issues result in the need for surgeons to be trained again to use such robots and long preparation time is required. Consequently, surgeons are not willing to use surgery robots in many cases.

To avoid using an optical tracking system, one solution is to rigidly connect the robot positioning system to the surgery subject. In a process described in U.S. Pat. No. 9,872,733, a very compact and small positioning robot is fixed to the bone, so that even if the bone moves unexpectedly, the relative position between the bone and the robot is kept unchanged. However, in this solution the mounting procedure of the robot is complicated. Any looseness of the robot can also result in poor accuracy, and this looseness cannot be detected by the system itself.

Visual servo technology, or the image feedback method, may be a potential solution for robot-assisted surgery. In recent years, visual servo technology has been receiving more attention in the field of robotics. In visual servo methods, motion and position information for the target and robot are obtained through images acquired by visual sensors. Such methods can be used in real time for robot motion control to guide a robot to complete a specific task, as discussed in Chaumetee, et al. (Francois Chaumetee and Seth Hutchinson, Visual servo control Part I: Basic approaches, IEEE Robotics & Automation Magazine, December 2006, 82-90). In the visual servo framework, a closed-loop control based on image feedback is used and the positioning accuracy of the robots is higher than that of open-loop control systems. On the other hand, with the development of digital image processing technology, the requirement of visual markers/trackers mounted on the target is becoming lower and the geometry of the target itself can be used.

Although an image servoing method to implement needle alignment in percutaneous procedures without using markers/trackers has been suggested by Patriciu, et al. (U.S. Pat. No. 7,008,373 and Alexandru Patriciu, et al., Motion-Based Robotic Instrument Targeting Under C-Arm Fluoroscopy, Medical Image Computing and Computer-Assisted Intervention, Oct. 11-14, 2000, Pittsburgh, PA, Lecture Notes in Computer Science, Springer-Verlag, Vol. 1935, pp. 988-998), its way of working is different from surgeons' usual operations. This method tries to apply an "uncalibrated" methodology to achieve accurate needle placement without both precise camera/imager calibration and registration of the robot to the image acquiring equipment (J. P. Hespanha, Z. Dodds, G. D. Hager, and A. S. Morse, What Tasks can be Performed with an Uncalibrated Stereo Vision System? International Journal of Computer Vision 1999, 35(1), 65-85). However, this method has not been adopted and has led only to further research efforts.

SUMMARY

There remains a need, therefore, for improved surgery robots and robotic surgery techniques which use visual servo technology, or the image feedback method, in particular for conducting drilling operations. The present invention relates to surgical robots and techniques, in particular to drilling operations guided by intraoperative 2D X-ray images. A feature of the invention is that it follows a surgeon's conventional way of thinking during surgical operations. The invention can be applied to surgery robots such as orthopedic surgery robots and percutaneous intervention robots.

BRIEF DESCRIPTION OF THE DRAWINGS

FIG. 16 is an exploded side elevation view of the locking ring assembly of FIG. 15.

FIG. 17E is an exploded perspective view of the interface medial portion and an embodiment of an interface locking ring.

FIG. 17F is a partially exploded perspective view of the interface medial portion and the interface locking ring of FIG. 17E.

FIG. 17G is a perspective view of the interface medial portion and the interface locking ring of FIG. 17E.

Figure 1:
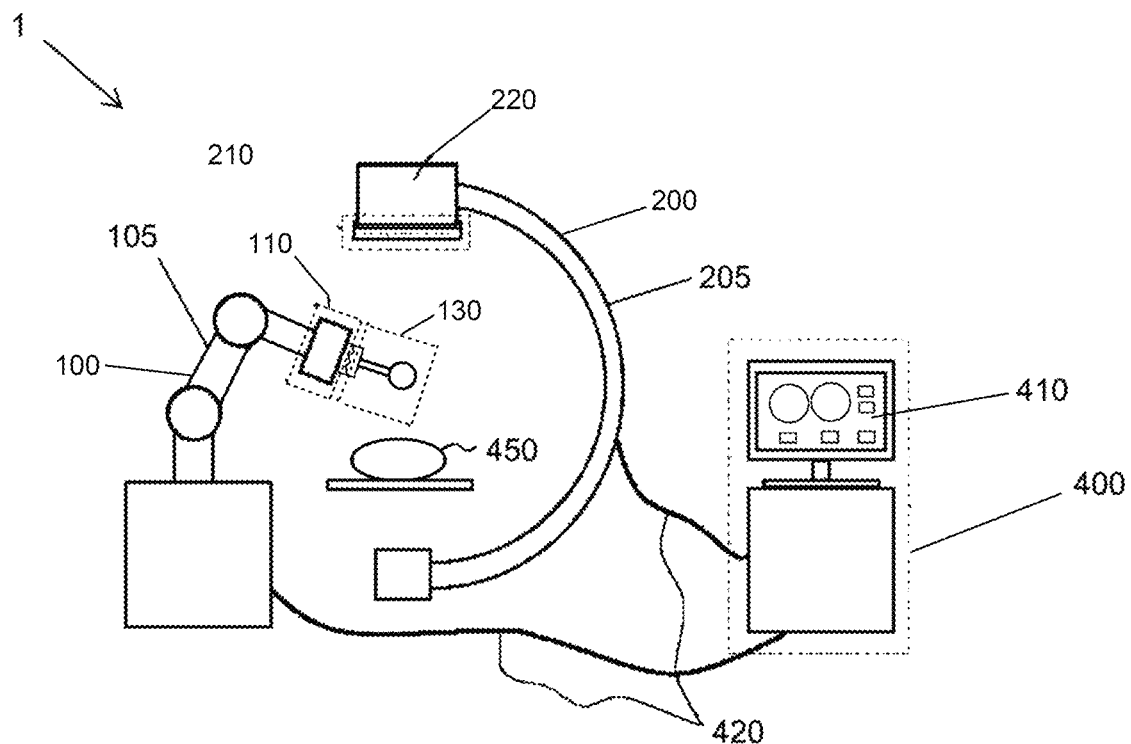
FIG. 1 is a diagram of an embodiment of the present surgical robot system.

The reference numbers in the figures have the following meanings:

| Component | Subcomponent | Reference Number |
|---|---|---|
| surgical robot system | | 1 |
| | beads | 4, 5, 6, 7, 9, 10, 11, 12 |
| | X-ray image | 14 |
| | X-ray image | 15 |
| | line segment | 16 |
| | line segment | 17 |
| | surgical screw | 18 |
| | surgical screw | 19 |
| | automatically extracted axis of a surgical tool | 20 |
| | automatically extracted axis of a surgical tool | 21 |
| | extension line of axis 20 | 22 |
| | extension line of axis 21 | 23 |
| surgical robot | | 100 |
| | robot arm | 105 |
| | robot arm proximal end | 106 |
| | robot arm distal end | 107 |
| | force sensor | 110 |
| | end-effector | 120 |
| | registration device | 126 |
| | drill guide | 127 |
| | electric drill | 128 |
| registration device | | 130 |
| | proximal end | 131 |
| | distal end | 132 |
| | first plane | 133 |
| | second plane | 134 |
| | line between a pair of beads | 135 |
| image acquisition device | | 200 |
| | C-arm of X-ray machine | 205 |
| | distortion correction device | 210 |
| | plane plate | 211 |
| | grid dots | 212 |
| | magnets | 215 |
| | image intensifier of the image acquisition device | 220 |
| | proximal end of image intensifier | 221 |
| | distal end of image intensifier | 222 |
| | mechanical interface for distortion correction device | 230 |
| robot arm interface | | 300 |
| | film | 310 |
| | central opening | 311 |
| | occluded area | 315 |
| | distal surface | 318 |
| | proximal surface | 319 |
| locking ring | | 320 |
| | central opening | 321 |
| | proximal end | 322 |
| | distal end | 323 |
| | inner surface | 324 |
| | outer surface | 325 |
| | inner projections | 327 |
| | outer projections (finger tightening) | 329 |
| robot arm interface proximal portion | | 330 |
| | central projection | 317 |
| | central opening | 331 |
| | locking flange opening | 331a |
| | proximal end | 332 |
| | distal end | 333 |
| | inner surface | 334 |

-continued

| Component | Subcomponent | Reference Number |
|---|---|---|
| | outer surface | 335 |
| | proximal slot opening | 336 |
| | proximal surface | 338 |
| | distal surface | 339 |
| | slot | 373 |
| | slot inner pocket | 374 |
| | outer rim | 375 |
| robot arm interface medial portion | | 340 |
| | central opening | 341 |
| | locking flange opening | 341a |
| | proximal end | 342 |
| | distal end | 343 |
| | inner surface | 344 |
| | outer surface | 345 |
| | slot | 346 |
| | proximal surface | 348 |
| | distal surface | 349 |
| | proximally extending projection | 350 |
| | locking flange | 351 |
| | locking flange channel | 352 |
| | locking flange projection | 353 |
| | proximal locking flange projection | 353a |
| | distal locking flange projection | 353b |
| | distally extending central projection | 354 |
| | distal rim | 356 |
| | distal rim proximal surface | 356a |
| | distal rim distal surface | 356b |
| | distal central opening | 357 |
| | outer rim | 355 |
| | distal projection (finger tightening) | 359 |
| interface distal portion | | 360 |
| | proximal end | 361 |
| | distal end | 362 |
| | rim | 365 |
| | proximal surface | 368 |
| | distal surface | 369 |
| | central projection | 370 |
| interface locking ring | | 380 |
| | locking ring portions | 380a, 380b, 380c |
| | central opening | 381 |
| | proximal surface | 382 |
| | distal surface | 383 |
| | inner surface | 384 |
| | outer surface | 385 |
| | inner projections | 387 |
| | outer projections (finger tightening) | 389 |
| | slot pocket | 394 |
| | remote workstation | 400 |
| | graphical user interface | 410 |
| | data cable | 420 |
| | patient | 450 |

DETAILED DESCRIPTION

Definitions

As used herein, the following terms and variations thereof have the meanings given below, unless a different meaning is clearly intended by the context in which such term is used.

"2D" refers to two-dimensional areas, images, or other representations of two-dimensional areas. Images on a computer monitor are two-dimensional. "3D" refers to three-dimensional spaces or to representations of three-dimensional spaces.

"Array" and "grid" refer to an arrangement of lines, dots, or other forms in an ordered two-dimensional pattern, typically an arrangement in perpendicular rows.

"Bead" refers to a relatively small, typically rounded piece of material.

"Image intensifier" refers to a component of an X-ray imaging system which intercepts x-ray photons and converts them into visible light photons and (b) amplifies or intensifies this light signal. Within an image intensifier, the input phosphor converts the x-ray photons to light photons, which are then converted to photoelectrons within the photocathode. The electrons are accelerated and focused by a series of electrodes striking the output phosphor, which converts the accelerated electrons into light photons that may be captured by various imaging devices.

"Image registration" refers to the process of transforming different sets of data into one coordinate system.

"Normalized distance" refers to a ratio of the distance between (1) a first endpoint on a line and the crossing point with another line, and (2) the distance between the first endpoint to the other endpoint of the line.

"Pocket" refers to a space sized to receive a predetermined component.

The terms "above," "below," "between," and other terms of relative position or orientation as used herein refer to a relative position of one layer with respect to other layers. As such, one layer disposed above or below another layer may be directly in contact with the other layer or may have one or more intervening layers, unless described otherwise herein.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

Surgical Robots

The present invention provides an 2D image-guided surgical robot system for use in drilling operations and an image feedback control method which overcomes the deficiencies of prior technologies with respect to their high hardware requirements, complicated workflow, and risk of iatrogenic injuries. Importantly, the present system and method allow a surgeon to follow a conventional way of thinking during surgical operations. The present image feedback control method only relies on 2D intraoperative X-ray images, in other words, the use of G-arm or C-arm X-ray machines commonly used in the operating room are sufficient, eliminating iatrogenic injuries caused by invasive optical markers and the extra costs of CT scans, and thus the risk of radiation-induced disease is also reduced.

In one embodiment, the present system comprises a robot arm with an electric drill or a drill guide as its end-effector, a surgical image acquisition device, an X-ray image distortion correction device, a registration device, a remote operation workstation with a GUI for the doctors to interact with the system, and control software running on the workstation. The robot arm preferably has at least three translational degrees of freedom, or at least two rotational degrees of freedom, a force sensor mounted on its end, and a mechanical interface to attach the electric drill, drill guide or registration device. The remote operation workstation is connected to the surgical image acquisition system and the robot arm with data cables and is used to process the surgical images, plan the drilling path, and control the motion of the robot arm. The surgical image acquisition device can provide intraoperative 2D X-ray images, including the commonly used G-arm or C-arm X-ray machines.

FIG. 1 illustrates an embodiment of the present surgical robot system 1, which can include a robot arm 100, force sensor 110, registration device 130, image acquisition device (C-arm X-ray machine) 200, image intensifier of the image acquisition device 220, distortion correction device 210, remote workstation 400, graphical user interface 410, and a data cable 500. The position of a subject 450 on which the present surgical robot 100 can be used is also shown. The remote operation workstation 400 can be connected to the surgical image acquisition system 200 and the robot arm 105 with data cables 420, and can be used to process surgical images, plan a drilling path, and control the motion of the robot arm, for example. The surgical image acquisition device 200 provides intraoperative 2D X-ray images, and can be a G-arm or C-arm X-ray machine.

Figure 2:
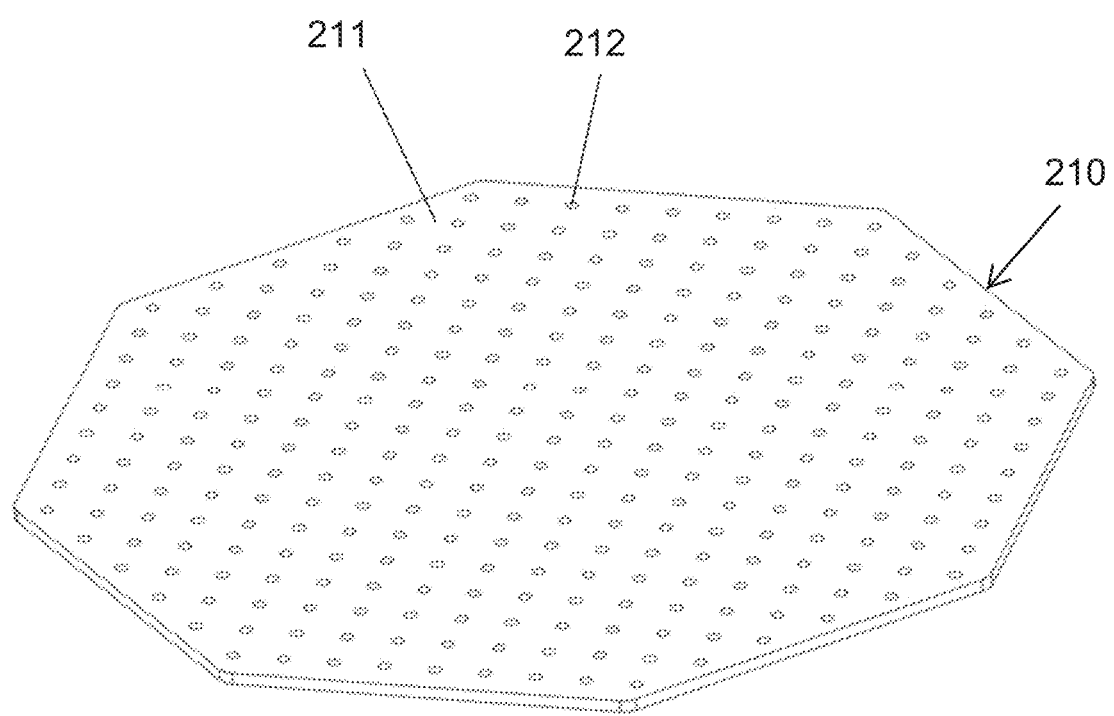
FIG. 2 is a perspective view of an X-ray image distortion correction device.

FIG. 2 is an illustration of the X-ray image distortion correction device 210 provided by this invention. In this embodiment, a plane plate 221 is made from X-ray transparent material on which an array of beads 212 which are opaque to X-rays, such as metal beads, is embedded or otherwise attached or adhered to the plate 221. The configuration of the metal bead array is predefined, and can be in the form of a grid as shown in FIG. 2. For example, in the embodiment of FIG. 2, the metal beads are repeatedly arranged with a constant distance in two perpendicular directions. To perform X-ray image distortion correction, the X-ray image distortion correction device is attached to the image intensifier of the surgical image acquisition device and an X-ray image is then acquired. The X-ray image distortion correction device should cover the field-of-view of the image intensifier so that the acquired X-ray image is filled with images of the metal beads. The mounting orientation of the X-ray image distortion correction device should not be restricted.

Figure 3:
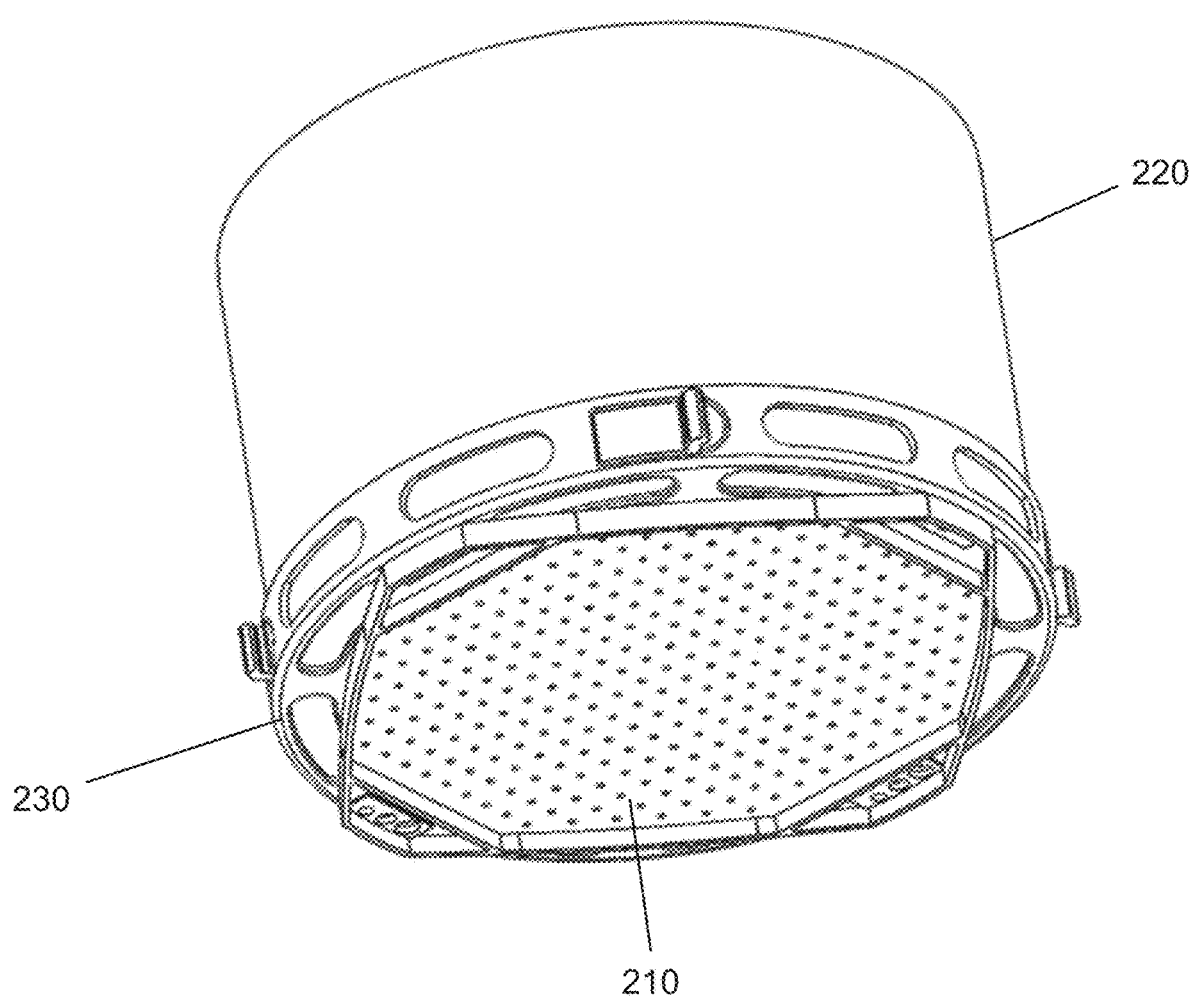
FIG. 3 is a perspective view of the X-ray image distortion correction device of FIG. 2 mounted on an image intensifier.
Figure 4:
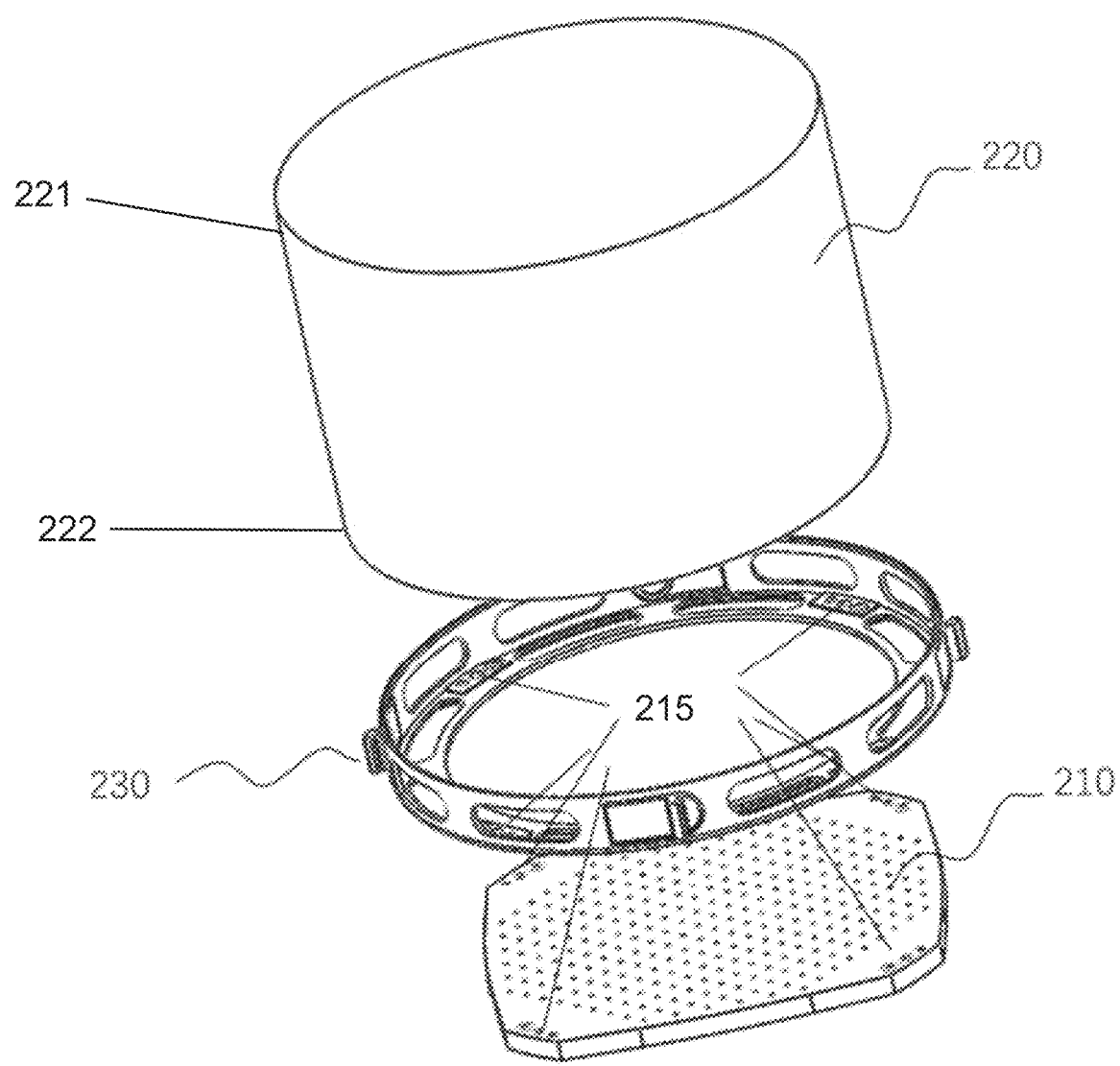
FIG. 4 is an exploded perspective view of the image intensifier assembly of FIG. 3.

As shown in FIGS. 3 and 4, the image distortion correction device 210 is used with an image intensifier 220 of an image acquisition device 200, such as an X-ray imaging system. The image distortion correction device 210 is reversibly secured to a distal end 222 of the image intensifier 220, with the proximal end 221 being attached to or integrally part of the remainder of image acquisition device 200. In the illustrated embodiment, the image distortion correction device 210 is reversibly secured to a ring-shaped mechanical interface 230 via magnets 215 on the image distortion correction device 210 which can be placed in contact with or in proximity to corresponding magnets on the mechanical interface 230. The mechanical interface 230 is then secured to the distal end 222 of the image intensifier 220 either in a similar manner (with magnets) or in other ways known to the art.

Figure 5:
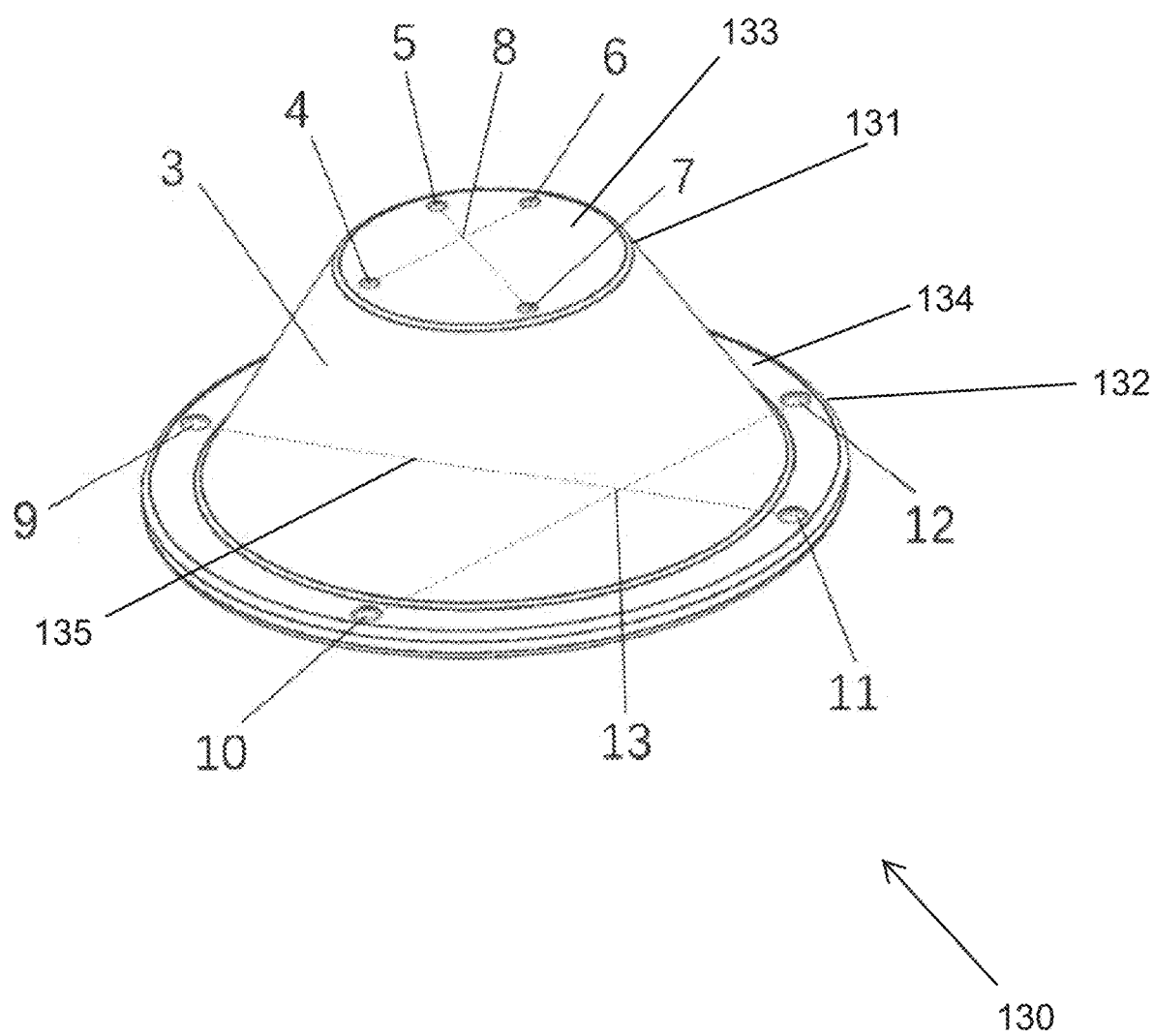
FIG. 5 is a perspective view of an embodiment of the present image registration device.

FIG. 5 illustrates a registration device of the present invention. In this embodiment, 3 is a base made from X-ray transparent material, and in or on the base are beads made from a material that is opaque to X-rays and that have two different diameters. In the illustrated embodiment, 8 beads (4, 5, 6, 7, 9, 10, 11, 12) are used, with four beads arranged in a first plane 133 in the proximal end 131 of the base 3 and four beads arranged at the distal end 132 in a second plane 134. Lines 135 are illustrated between pairs of beads in these planes. Additional pairs of beads in each plane can be used.

In this embodiment, the beads are embedded and are preferably metal. The beads are divided into two sets according to their diameters. The diameter of the larger beads is larger than the smaller ones, preferably by at least 40 percent, and in this embodiment (as an example) the diameter of the larger metal beads (9, 10, 11, 12) is 1.5 times the diameter of the smaller metal beads (4, 5, 6, 7). The centers of the larger metal beads (9, 10, 11, 12) are in a second plane 134 and the centers of the smaller metal beads (4, 5, 6, 7) are in a first, different plane 133. The first and second planes can be parallel or not parallel. The centers of the larger metal beads (9, 10, 11, 12) make up the vertices of a convex polygon and the centers of the smaller metal beads (4, 5, 6, 7) make up the vertices of another convex polygon. The smaller beads, and the polygon which they form, preferably lie within the polygon formed by the larger beads, or vice versa, in order to better avoid occlusion between one of the small beads and one of the larger beads during imaging. The use of different sizes of beads is used to better distinguish the groups of beads in imaging.

The larger metal beads (9, 10, 11, 12) can be divided in to two pairs, i.e. (9, 11) and (10, 12). The line between beads 9 and 11 and the line between beads 10 and 12 intersect at point 13. The ratio of the distance between the center of a bead among the larger beads (9, 10, 11, 12) and point 13 to the distance between the center of this bead to that of the other bead in the same pair is different between each bead among the larger beads (9, 10, 11, 12). The smaller metal beads (4, 5, 6, 7) can be also divided in to two pairs, i.e. (4, 6) and (5, 7). The line between beads 4 and 6 and the line between beads 5 and 7 intersect at point 8. The ratio of the distance between the center of a bead among the smaller beads (4, 5, 6, 7) and point 8 to the distance between the center of this bead to the center of the other bead in the same pair is different from the distances between each bead among the larger beads (4, 5, 6, 7). This arrangement of the beads in the registration device is designed to simplify the process of matching the beads on the registration device with the beads in an image of the registration device.

Figure 8:
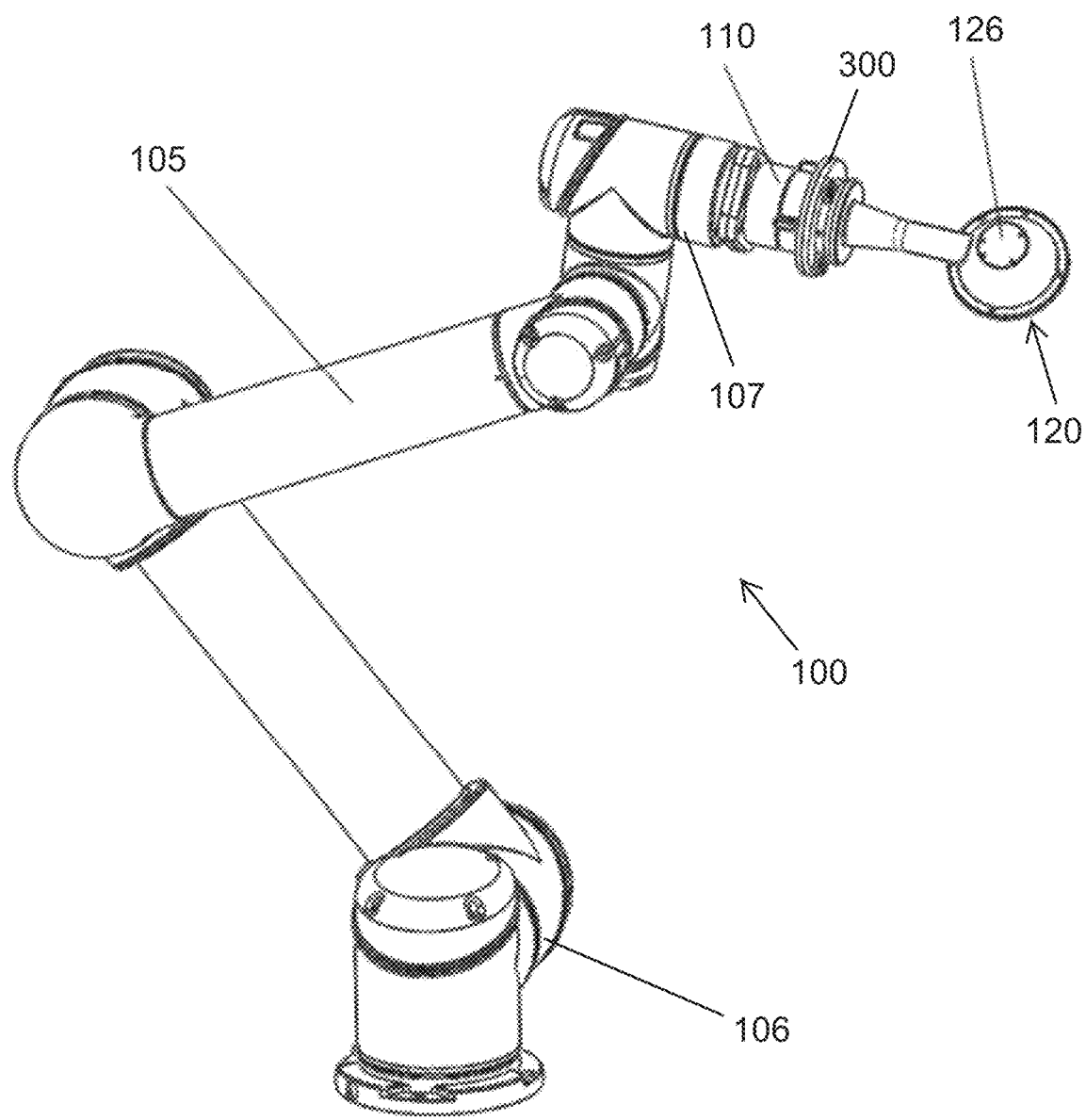
FIG. 8 is a perspective view of a robot arm with a registration device mounted on its end.
Figure 9:
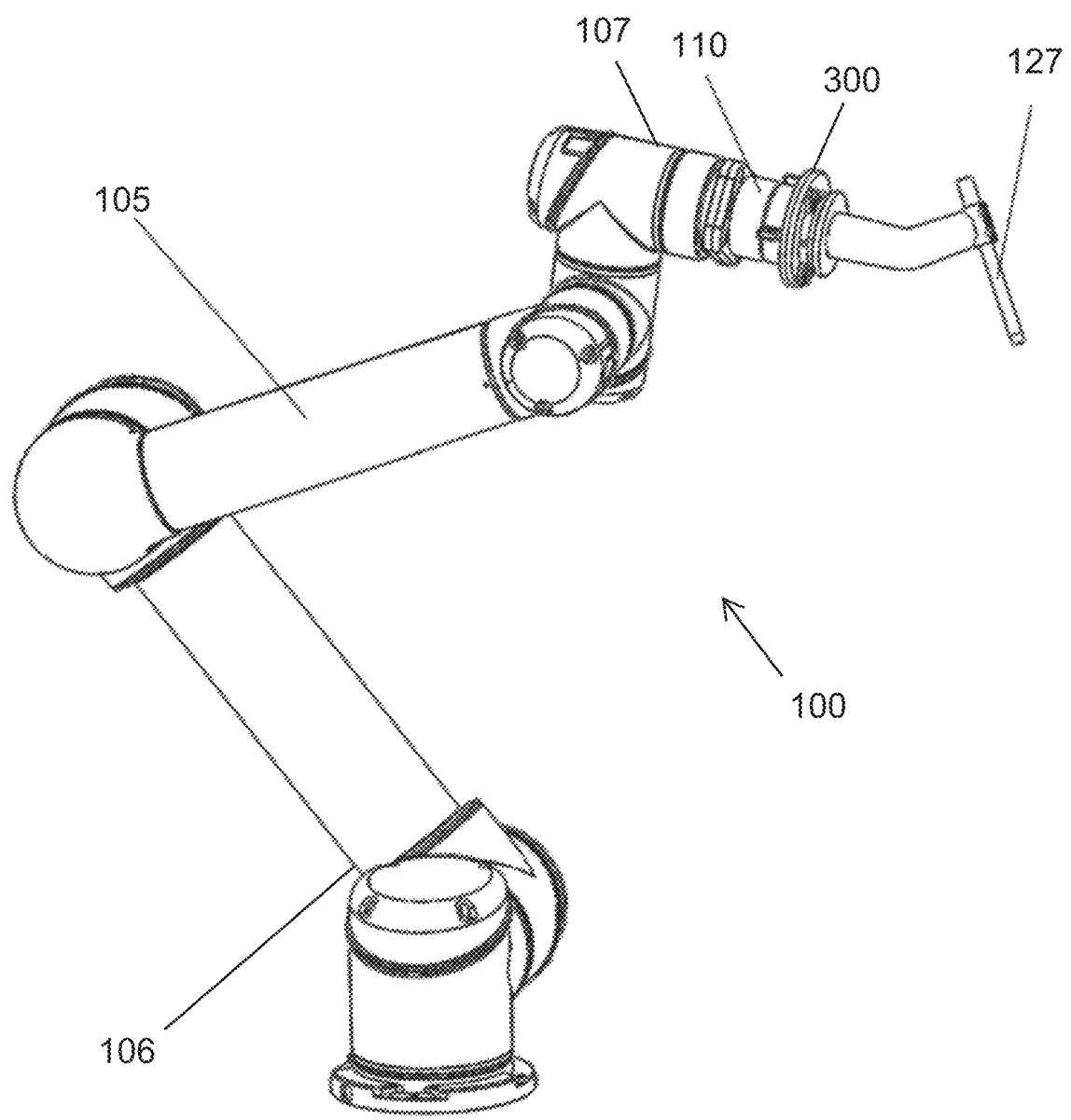
FIG. 9 is a perspective view of robot arm with a drill guide mounted on its end.
Figure 10:
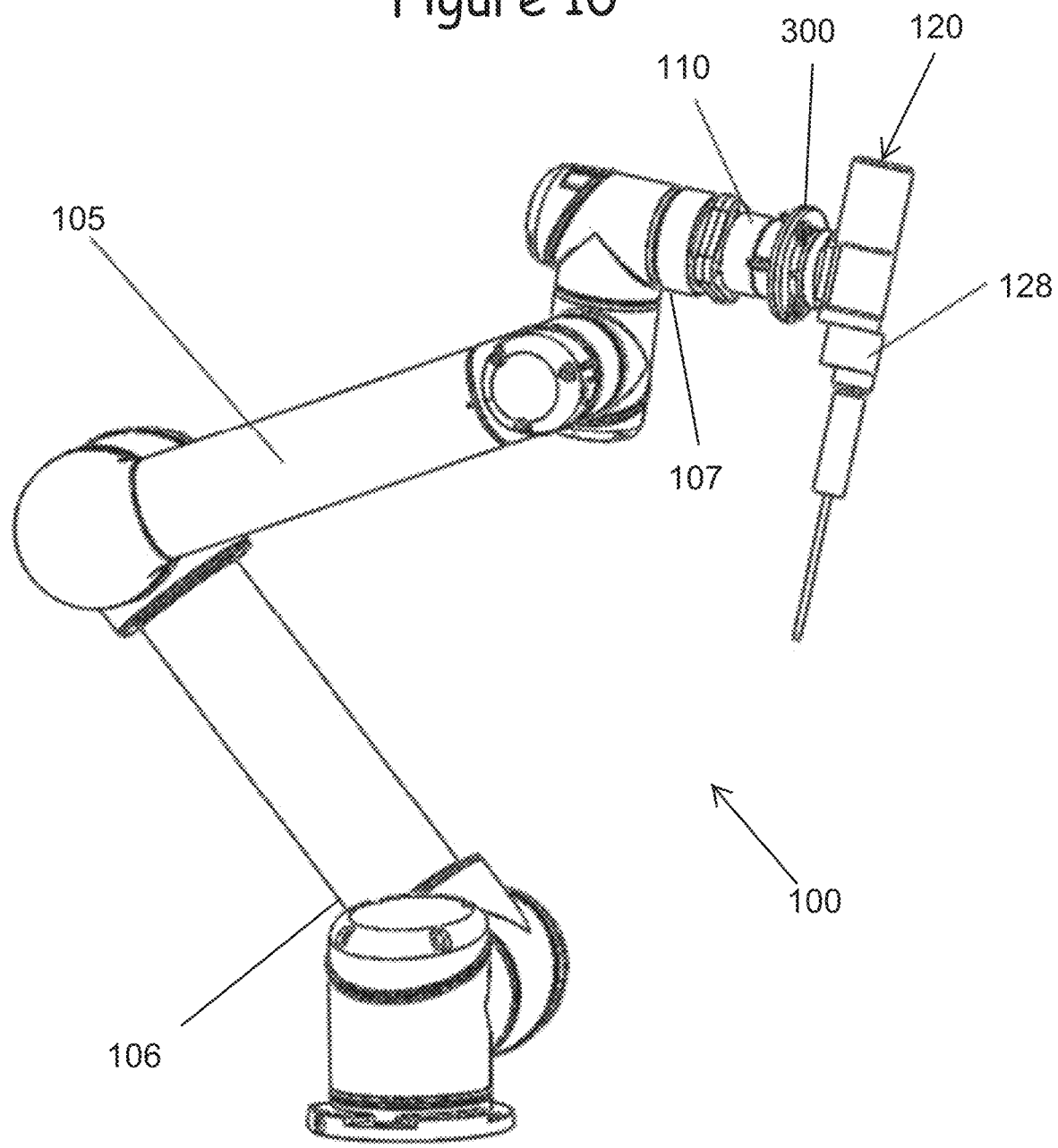
FIG. 10 is a perspective view of a robot arm with an electric drill mounted on its end.
Figure 11:
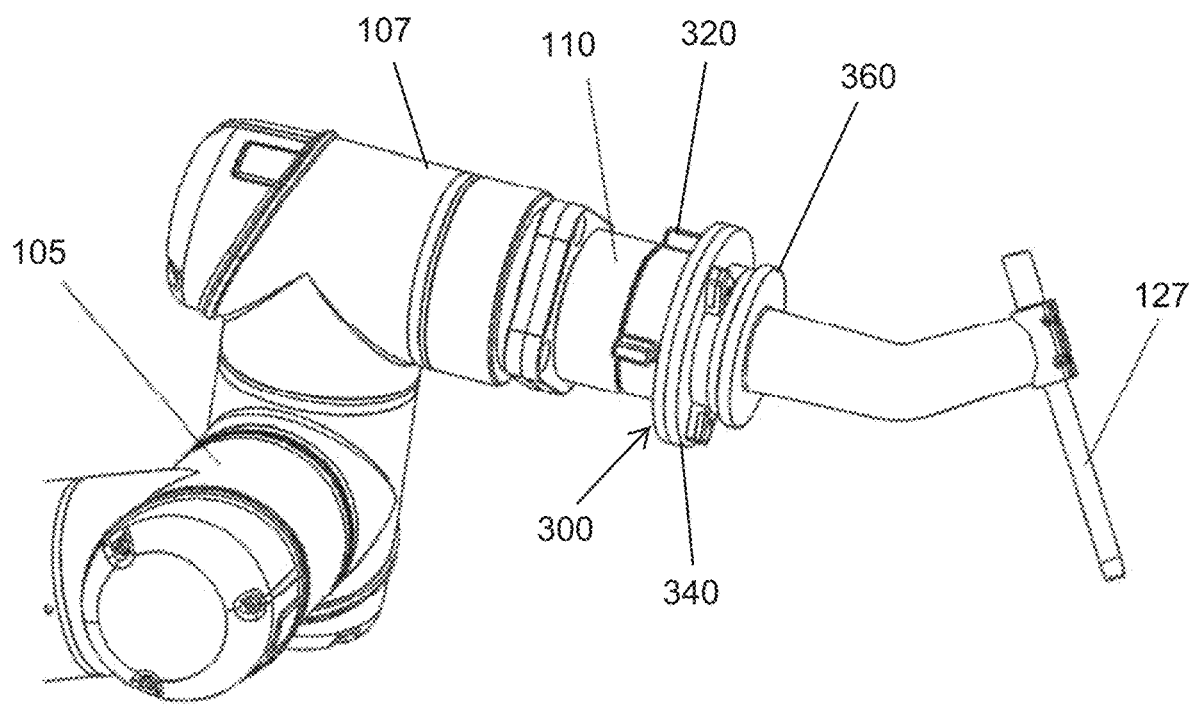
FIG. 11 is a perspective view of view of the distal end of the robot arm of FIG. 9.
Figure 12:
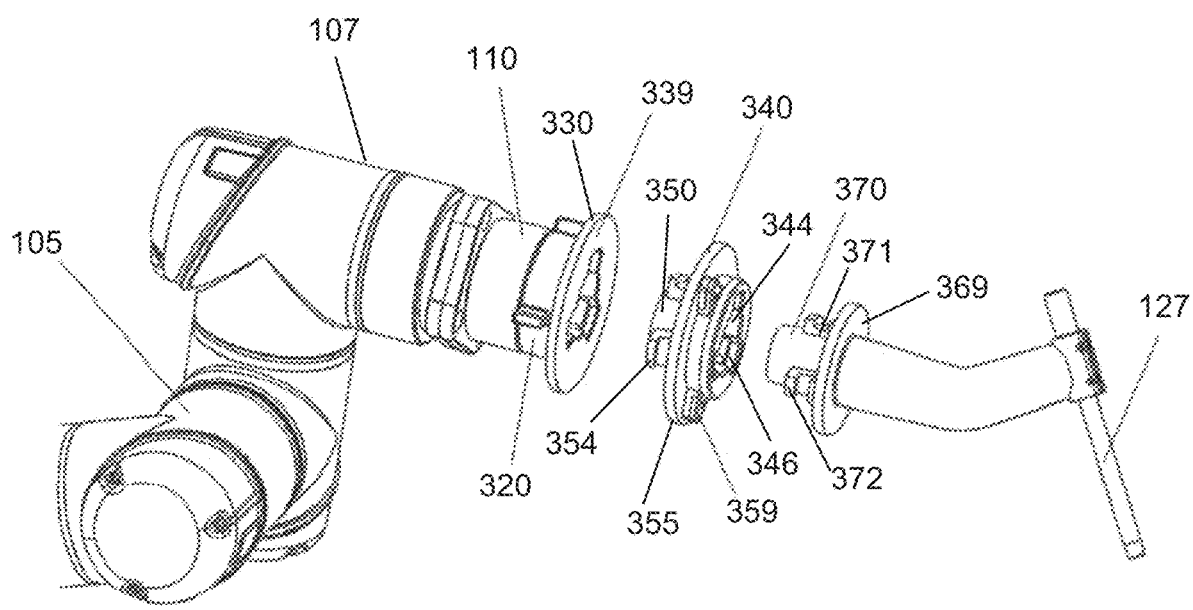
FIG. 12 is an exploded perspective view of the distal end of the robot arm of FIG. 9.

In the present surgical robot system 1, the robot arm 105 preferably has at least three translational degrees of freedom, and should have at least two rotational degrees of freedom. A force sensor 110 is mounted on its distal end 107, and a mechanical interface 300 is used to attach the robot arm 105 to an end effector 120 such as an electric drill 128, drill guide 127, or registration device 130. FIGS. 8, 9, and 10 illustrate examples of the robot arm 105 and various end effectors 120, such as a registration device 126 (FIG. 8), drill guide 127 (FIG. 9), and drill 128 (FIG. 10), mounted on the distal end 107 of the robot arm 105 respectively. A force sensor 110 is installed between the end-effector 120 and the distal end 107 of the robot arm to sense the force acting on the end-effectors.

FIGS. 11-16 illustrate an embodiment of robotic arm 105 with a mechanical interface 300 for connecting the robot arm 105 to end-effectors 120. In this embodiment, the mechanical interface 300 can be divided into three portions, a proximal interface portion 330 secured to the distal end 107 of the robot arm 105, a medial portion 340, and a distal portion 360, which can be secured to an end effector 120 or can be integrally formed with an end effector. The portions of the mechanical interface 300 are preferably rotationally symmetric.

Figure 18A:
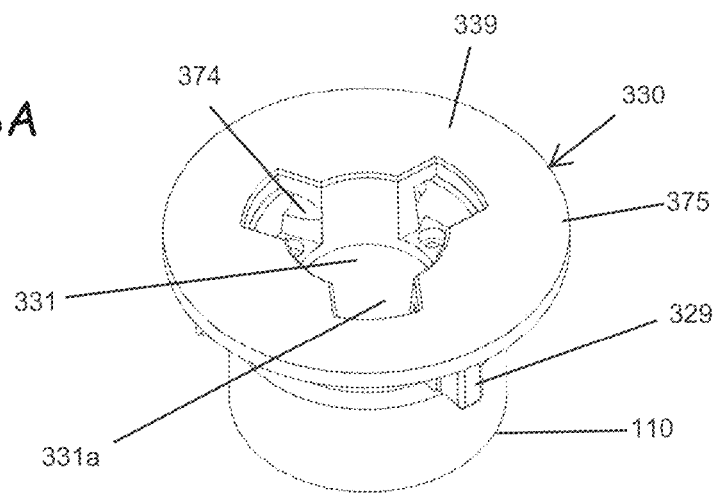
FIG. 18A is a perspective view of the distal end of the locking ring assembly.
Figure 18B:
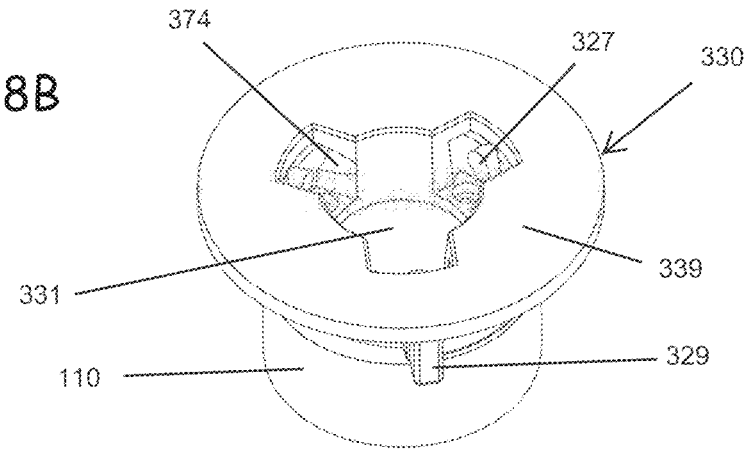
FIG. 18B is a perspective view of the distal end of the locking ring assembly with the locking ring rotated partially clockwise when viewed from the distal end.
Figure 18C:
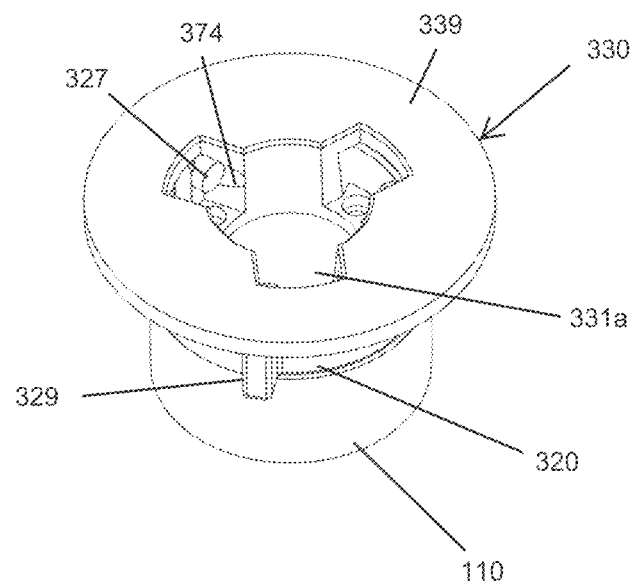
FIG. 18C is a perspective view of the distal end of the locking ring assembly with the locking ring rotated fully clockwise when viewed from the distal end.

The proximal portion 330 of the interface (interface proximal portion) includes a central opening 331 which further comprises a plurality of locking flange openings 331a (see FIG. 18). The embodiments illustrated in the figures include three such locking flange openings 331a arranged concentrically around the central opening 331. The interface proximal portion 330 further includes a proximal end 332, a distal end 333, an inner surface 334, an outer surface 335, slot openings 336, a proximal surface 338, a distal surface 339, slots 373, slot inner pockets 374, an outer rim 375, and a central projection 317. The central projection 317 extends proximally, and at the proximal end 332 of the central projection 317 are proximal slot openings 336, which are for receiving the inwardly extending inner projections 327 of a locking ring 320. The inner projections 327 each fit into slots 373 in communication with the slot openings 336. At the distal end 333 the interface proximal portion 330 is an outer rim 375 which has a proximally facing surface 338 and a distally facing surface 339.

Figure 14:
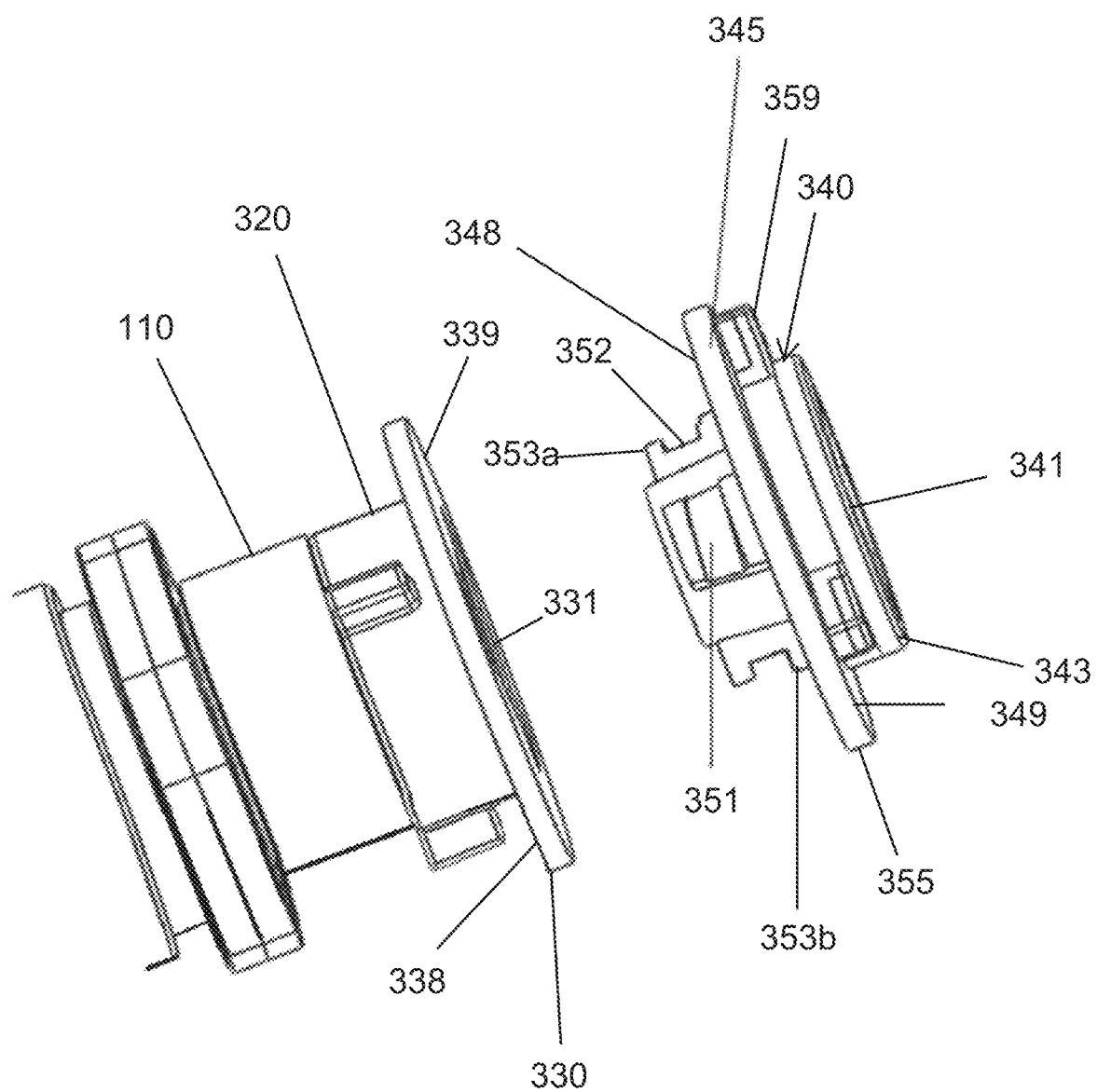
FIG. 14 is an exploded side elevation view of a locking ring assembly and a medial portion of a robot arm interface, with the locking ring assembly comprising a locking ring and a proximal portion of the robot arm interface connected to the proximal portion of the robot arm of FIG. 9.
Figure 15:
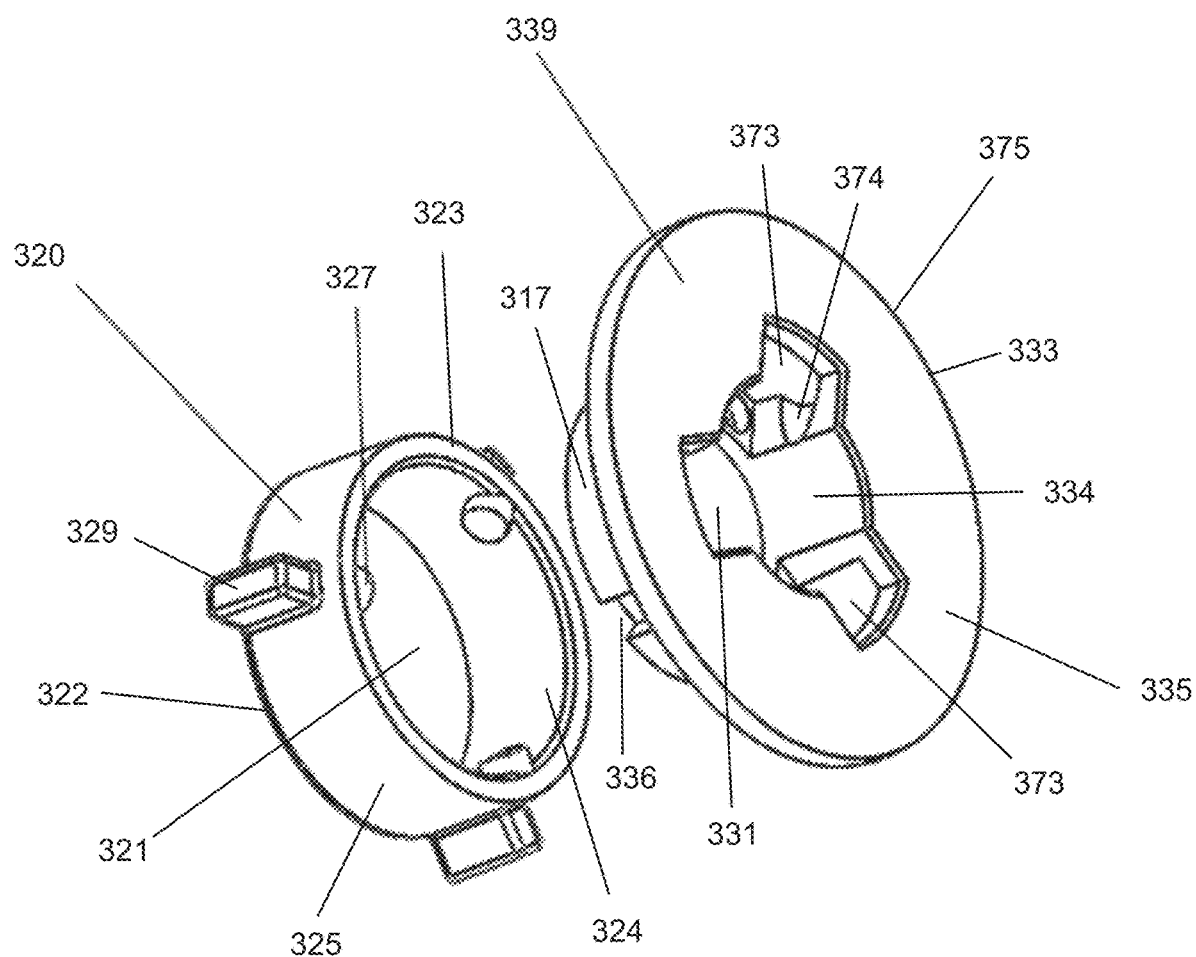
FIG. 15 is an exploded perspective view of the locking ring assembly of FIG. 14.

At the distal end 107 of the robot arm 105 and proximally located with respect to the proximally facing surface 338 is a rotatable locking ring 320. As shown in FIGS. 14-16, the locking ring 320 surrounds the outer surface 335 of the central projection 317 of the interface proximal portion 330 such that the inner surface 324 of the locking ring 320 faces the outer surface 335 of the central projection 317. Preferably, both the inner surface 324 of the locking ring 320 and the outer surface 335 of the central projection 317 are generally cylindrical. The locking ring 320 further includes a central opening 321, a proximal end 322, a distal end 323, an outer surface 325, and outer projections 329 (for finger tightening of the locking ring). The inner projections 327 extend inwardly from the inner surface 324 into the central opening 321 and serve to secure the locking ring 320 and interface proximal portion 330 to the interface medial portion 340 of the interface 300 when the locking ring 320 is rotated. The locking ring generally has the same number of inner projections 327 as the number of locking flanges 351 of the interface medial portion 340, and preferably includes at least 3 inner projections 327. The outer projections 329 of the locking ring 320 extend outwardly from the outer surface 325 of the locking ring in order to allow rotation of the locking ring.

The interface medial portion 340 is configured to engage and be secured to the interface proximal portion 330. The medial portion 340 includes a central opening 341, locking flange openings 341a, a proximal end 342, a distal end 343, an inner surface 344, an outer surface 345, a proximal surface 348, and a distal surface 349. The proximal end 342 includes a central projection 350, and around the periphery of this are a plurality of locking flanges 351 which extend outwardly from the outer surface of the central projection 350 around its periphery. Each locking flange 351 comprises at least a proximal locking flange projection 353a extending outwardly from the central projection 350, and preferably also a distal locking flange projection 353b located distally with respect to the proximal locking flange projection 353a and likewise extending outwardly from the central projection 350. Located distally of the proximal locking flange projection 353a and preferably between the proximal locking flange projection 353a and distal locking flange projection 353b is a locking flange channel 352.

The locking flange openings 331a of the interface proximal portion 330 are arranged concentrically around the central opening 331 at the distal end 333 of the interface proximal portion 330 and are configured to receive the locking flanges 351. In order to secure the interface medial portion 340 to the interface proximal portion 330, the proximal end 342 of the interface medial portion 340 is inserted into the central opening 331 of the interface proximal portion 330 so that the locking flanges 351 pass through the locking flange openings 331a. The distal surface 339 of the interface proximal portion 330 then faces the proximal surface 348 of interface medial portion 340, and preferably these surfaces are in contact in order to secure the interface medial portion 340 to the robot arm 105. Rotation of the locking ring 320 then urges each of the projections 327 into a respective locking flange channel 352 of the locking flanges 351, preferably creating an interference fit with the locking flange channels. Distal movement of the interface proximal portion 330 (i.e., removal) is thereby restricted by contact between the proximal locking flange projections 353a and the inner projections 327 of the locking ring, while distal locking flange projections 353b preferably help to create a tight interference fit between the interface proximal portion 330 and the interface medial portion 340. Slot pockets 374 provide a circumferential stopping point for the inner projections 327 such that further rotation of the locking ring 320 is stopped by contact between each of the inner projections 327 and a respective slot pocket 374.

The interface medial portion 340 further includes an outer rim 355 having a proximally facing surface (proximal surface 348) which faces the distally facing surface 339 of the proximal portion 330 of the interface 300. The proximal surface 348 of interface medial portion 340 and distal surface 339 of interface proximal portion 330 are both preferably planar, so that when the proximal portion 330 and medial portion 340 are engaged, the distally facing planar surface 339 is preferably in contact with either the proximal surface 348 of the interface medial portion 340 or with a film 310, as described further below.

Figure 13:
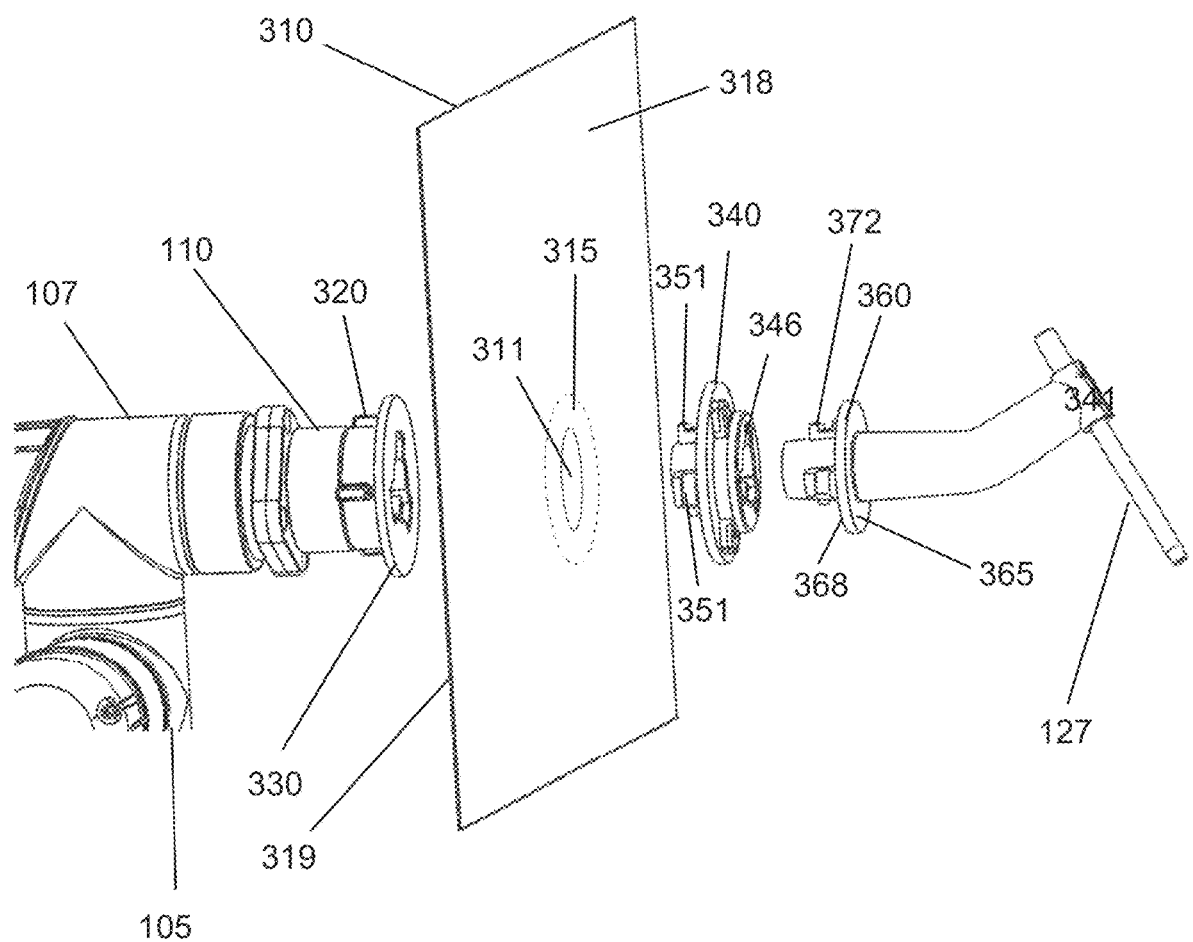
FIG. 13 is an exploded perspective view of the distal end of the robot arm of FIG. 9 and a plastic film placed between components of the robot arm.

During surgery, the interface proximal portion 330 and the interface medial portion 340 are preferably docked together with a plastic film 310 between them, as shown in FIG. 13. The distal surface 318 of the film 310 is preferably maintained in a sterile condition prior to a surgery. This facilitates the maintenance of a sterile boundary between the end effector 120 (such as a drill) and the robot arm 105. The film 310 includes a central opening 311, a proximal surface 319 adjacent the distal surface 339 of the interface proximal portion 330, and a distal surface 318 adjacent the proximal surface 348 of the interface medial portion 340. A hole is cut or otherwise provided in the plastic film 310 to provide the central opening 311 before use (if not already present) so that the plastic film will not interfere with securing the interface proximal portion 330 to the interface medial portion 340. The outer diameter of the outer rim 375 of interface proximal portion 330 and the outer rim 355 of the interface medial portion 340 are preferably larger than the outer diameter of the locking ring 320, and also larger than the diameter of the central opening 311 of the film 300, so that an occluded area 315 (shown by the shaded area 315 of the plastic film 310 in FIG. 13) fits between and is covered by the distal surface 339 of the proximal interface portion 330 and the proximal surface 348 of the medial interface portion 340. The occluded area 315 of the film 310 is preferably constrained tightly by these surfaces through a friction fit.

Figure 17A:
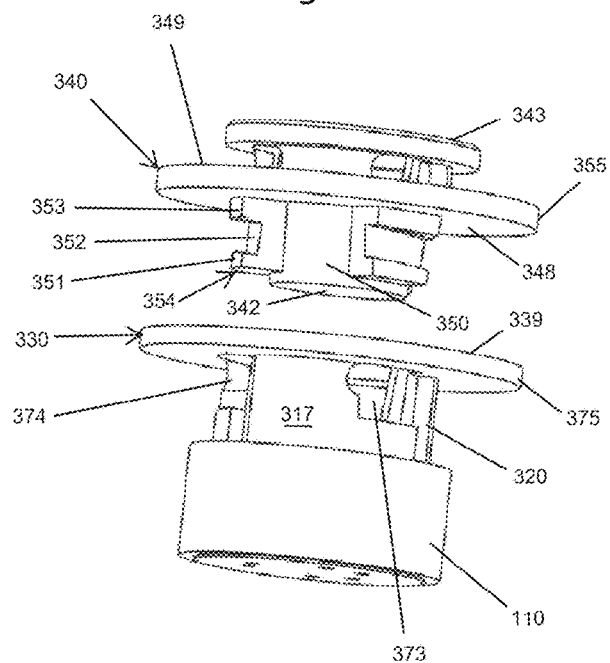
FIG. 17A is an exploded perspective view of the locking ring assembly and a medial portion of the robot arm interface, with the locking ring shown in partial cutaway.
Figure 17B:
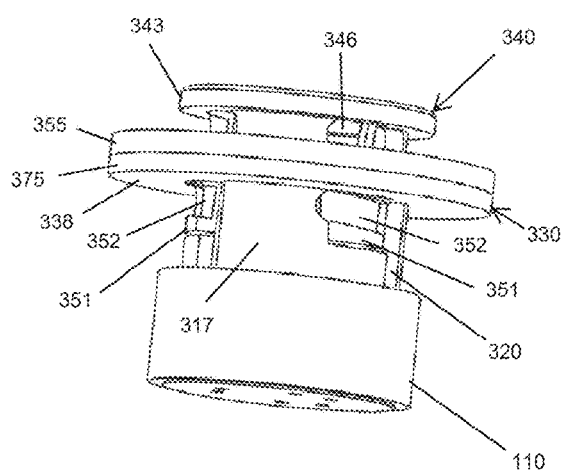
FIG. 17B is a perspective view of the locking ring assembly inserted into the medial portion of the robot arm interface, with the locking ring shown in partial cutaway.
Figure 17C:
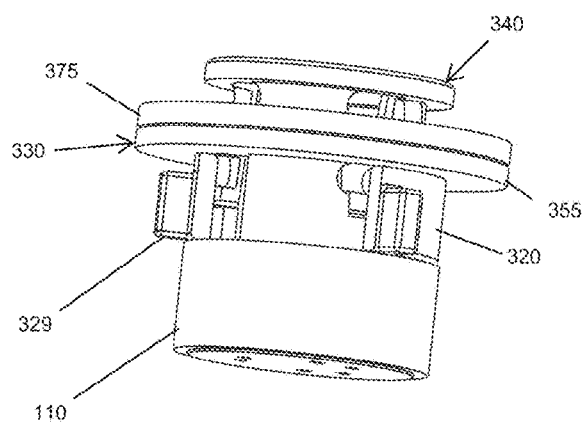
FIG. 17C is another perspective view of the locking ring assembly inserted into the medial portion of the robot arm interface, with the locking ring shown in partial cutaway and rotated partially clockwise when viewed from the distal end of the robot arm interface.
Figure 17D:
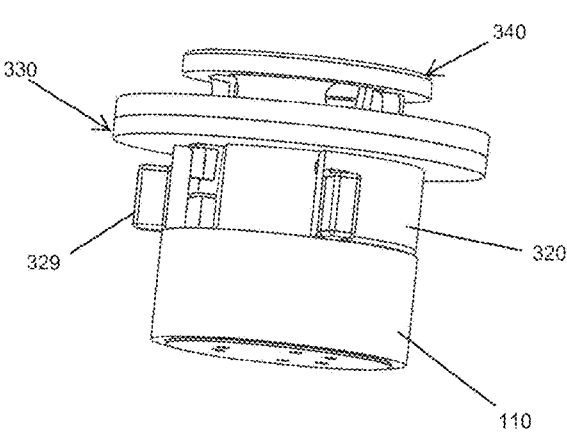
FIG. 17D is a further perspective view of the locking ring assembly inserted into the medial portion of the robot arm interface, with the locking ring shown in partial cutaway and rotated fully clockwise when viewed from the distal end of the robot arm interface.
Figure 17H:
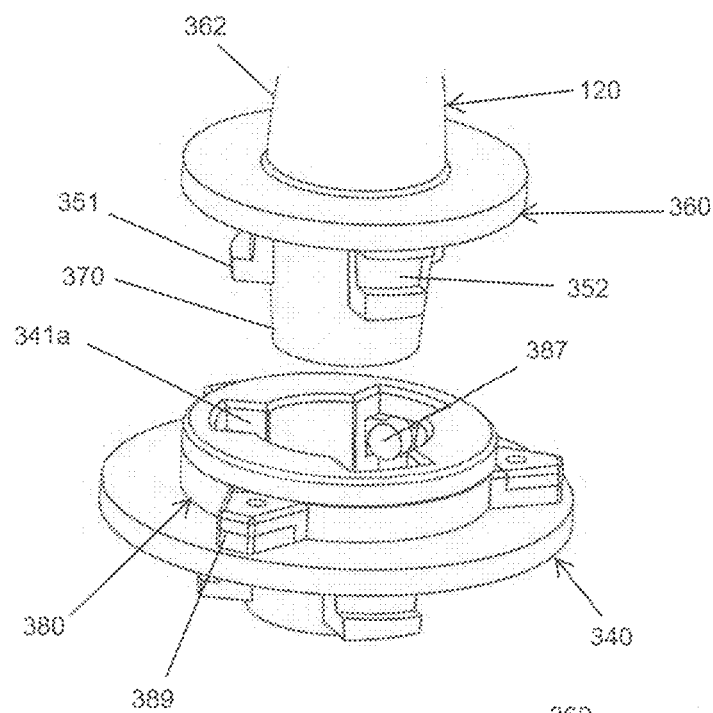
FIG. 17H is a perspective view of the interface medial portion and the interface locking ring of FIG. 17G and an embodiment of a distal portion of the interface.
Figure 17I:
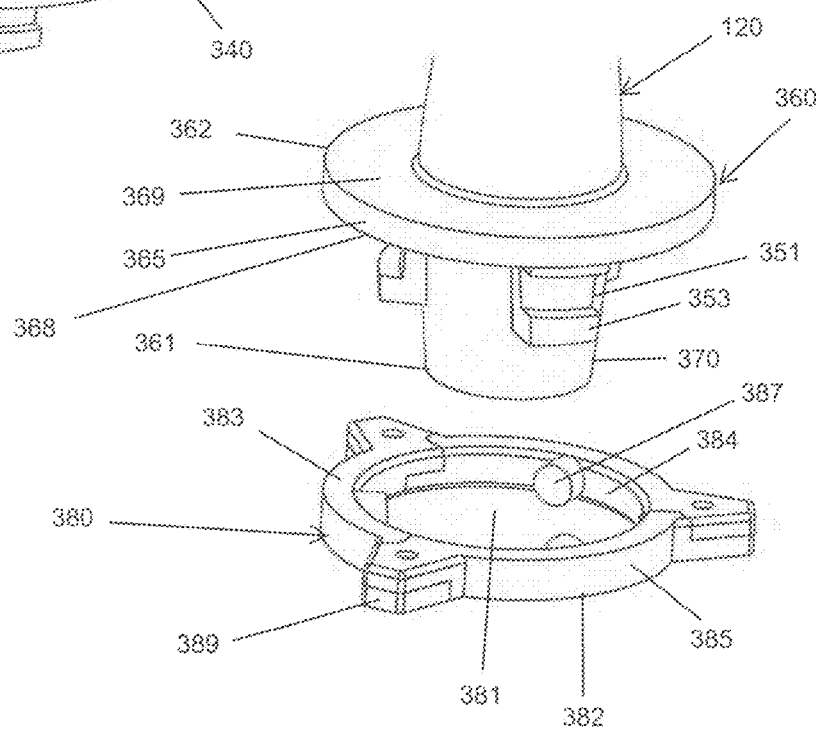
FIG. 17I is a perspective view of distal portion of the interface and the interface locking ring shown in FIG. 17H.

The medial portion 340 also includes a central opening 341 in the distal surface 349 with locking flange openings 341a arranged concentrically around the central opening 341 which are configured to receive locking flanges 351 of the interface distal portion 360. The interface medial portion 340 is configured to engage and be secured to the interface distal portion 360, which can be removably secured to the interface distal portion 360 in ways known to the art or can alternatively be integrally formed with an end effector 120. The interface distal portion 360 (see FIG. 17H-I) includes a proximal end 361, a distal end 362, a rim 365, a proximal surface 368, a distal surface 369, and a central projection 370. The central projection 370 extends proximally at the proximal end 362, and around the periphery of the central projection 370 are a plurality of locking flanges 351 which extend outwardly from the outer surface of the central projection 370 around its periphery. As with the locking flanges of the interface medial portion 340, each locking flange 351 of the interface distal portion 360 comprises at least a proximal locking flange projection 353a extending outwardly from the central projection 350, and preferably also a distal locking flange projection 353b located distally with respect to the proximal locking flange projection 353a and likewise extending outwardly from the central projection 370. Located distally of the proximal locking flange projection 353a and preferably between the proximal locking flange projection 353a and distal locking flange projection 353b is a locking flange channel 352.

The locking flange openings 341a of the interface medial portion 340 are arranged concentrically around the central opening 341 at the distal end 343 of the interface medial portion 340 and are configured to receive the locking flanges 351. In order to secure the interface distal portion 360 to the interface medial portion 340, the proximal end 362 of the interface distal portion 360 is inserted into the central opening 341 of the interface medial portion 340 so that the locking flanges 351 pass through the locking flange openings 341a. The distal surface 349 of the interface medial portion 340 then faces the proximal surface 368 of interface distal portion 360, and preferably these surfaces are in contact in order to secure the interface distal portion 360 to the interface medial portion 340.

An interface locking ring 380 is used to secure the interface distal portion 360 to the interface medial portion 340. The inner surface 384 of the interface locking ring 380 extends around the outer surface 345 of a distally extending central projection 354 which extends distally from the outer rim 355 of the interface medial portion 340. The interface locking ring 380 has a proximal surface 382, a distal surface 383, an outer surface 385, and an inner surface 384. The inner surface 384 further comprises a plurality of inner projections 387 that extend inwardly from the inner surface 384, in the same manner as inner projections 327 of the locking ring 320. In the embodiments illustrated in FIGS. 17E-17I, the interface locking ring 380 is illustrated as comprising three parts, 380a, 380b, and 380c respectively, which are secured to each other to form the interface locking ring 380, but one of skill in the art will understand that the locking ring 380 can be constructed in other ways. The proximal surface 382 of locking ring 380 preferably contacts the distal surface 349 of the outer rim 355 of the interface medial portion 340, while the distal surface 383 faces and preferably contacts a distal rim 356 at the distal end of the distally extending central projection 354, the distal rim 356 having a proximal surface 356a and distal surface 356b. The distal rim 356 constrains distal movement of the interface locking ring 380. Inner projections 387 extend through slots 346 in the interface medial portion 340.

Following insertion of the central projection 370 of the interface distal portion 360 into the central opening 341 of the interface medial portion 340, the interface distal portion 360 is secured to the interface medial portion 340 by rotating the interface locking ring 380, which urges each of the inner projections 387 into a respective locking flange channel 352 of the locking flanges 351, preferably creating an interference fit with the locking flange channels. Distal movement of the interface medial portion 340 (i.e., removal) is thereby restricted by contact between the proximal locking flange projections 353a and the inner projections 387 of the locking ring 380, while distal locking flange projections 353b preferably help to create a tight interference fit between the interface medial portion 330 and the interface distal portion 360. Slot pockets 394 provide a circumferential stopping point for the inner projections 387 such that further rotation of the locking ring 380 is stopped by contact between each of the inner projections 387 and a respective slot pocket 394. After the interface distal portion 360 is secured to the interface medial portion 340 and the interface medial portion 340 is likewise secured to the interface proximal portion 330, the end effector 120 is secured to the robot arm 105.

Robotic Surgical Processes

Figure 19:
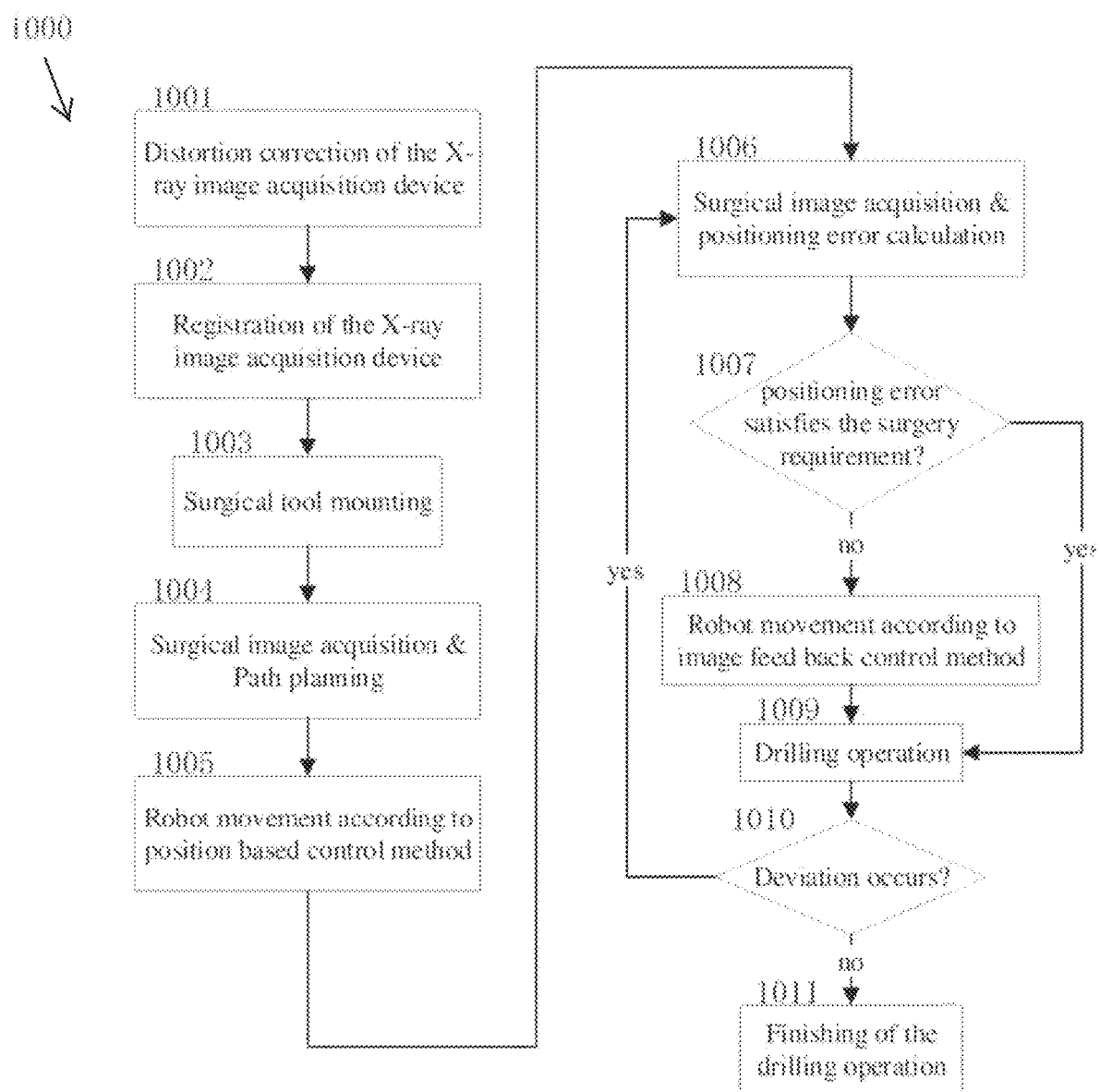
FIG. 19 is a flow chart showing the steps of a surgical procedure.

FIG. 19 is a block diagram of exemplary image feedback control method 1000 for a drilling operation based on the present 2D image-guided surgical robot system 1. In step 1001 the X-ray image distortion correction device 210 is mounted on the surgical image acquisition device 200 and the distortion is corrected under the two view angles determined by the specific surgery requirements respectively, and then the X-ray image distortion correction device 210 is unmounted.

In step 1002 the registration device 130 is attached to the end of the robot arm 105, then the registration procedures are conducted under the two view angles mentioned in step 1001 to acquire the parameters of the imaging model of the surgical image acquisition device 200 and also its spatial relationship with respect to the robot arm 105, and then the registration device 130 is detached from the robot arm 105.

In step 1003 the automatic drilling mode or the manual drilling mode is selected according to the surgery requirements. In the automatic drilling mode, an electric drill 128 is attached to the end of the robot arm, while in the manual drilling mode, a drill guide 127 is attached to the end of the robot arm 105.

In step 1004 the surgeon assigns the path for the surgical tool, i.e. the spatial coordinates along which the surgical tool will be moved by the robot arm, which is referred to as drilling path. The path is established by a surgeon or other user of the present system using the images acquired from the view angles mentioned in step 1001, preferably through the graphical user interface 410 on the remote operation workstation 400.

In step 1005 according to the drilling path assigned in step 1004, the remote operation workstation calculates the robot motion quantity using the position-based control method and controls the robot arm to move accordingly.

In step 1006 a new X-ray image is acquired from the two view angles mentioned in step 1001 respectively, and the position and orientation of the surgical tool (such as the drill guide, the drill, the guidewire or a puncture needle) in both images are extracted automatically with the image processing algorithms and shown on the graphical user interface. Any positioning error is calculated automatically according to the relative position and angle between the drilling path and the surgical tool in the images. The position and orientation of the surgical tool can be extracted directly from the images without using any markers or trackers attached to a surgical subject, so the present drilling processes are preferably accomplished without attaching or otherwise associating image markers or trackers on or around the subject.

In step 1007, if the positioning error satisfies the surgery requirements, the positioning procedure is finished, otherwise the process proceeds to step 1008. In step 1008, the remote operation workstation calculates the motion quantity using an image feedback control method and controls the robot arm to make further fine adjustments to finish the positioning procedure.

In step 1009, for automatic drilling mode in which the drill's movements are executed by the surgical robot, the electric drill spins and move along the drilling path driven by the robot arm 105, while the depth and speed of the drilling operation is assigned by the surgeon through the graphical user interface on the remote operation workstation.

In step 1010, during the drilling procedure, the surgeon can pause the operation and return to step 1006 to repeat the fine adjustment to correct any potential error caused by the drilling operation and increase the drilling accuracy. The drilling procedure is monitored by a force sensor 110 on the robot arm 105 and the electric drill stops spinning if abnormal force signals are detected. For manual drilling mode, the surgeon manually performs the drilling operation guided by the drill guide attached to the end of the robot arm.

In the above embodiment, the positioning error includes translational error and rotational error, where the translational error is defined as the root mean square of the vertical distances between the tip of the surgical tool and the drilling path in both X-ray images, the path being represented by the spatial coordinates along which the surgical tool will be moved by the robot arm. The rotational error is defined as the root mean square of the angles between the axis of the surgical tool and the drilling path in both X-ray images. The spatial coordinates can be in three orthogonal directions and around three orthogonal axes. The amount of the positioning error can be determined directly through the use of the images, without reference for example to trackers or markers.

Figure 20:
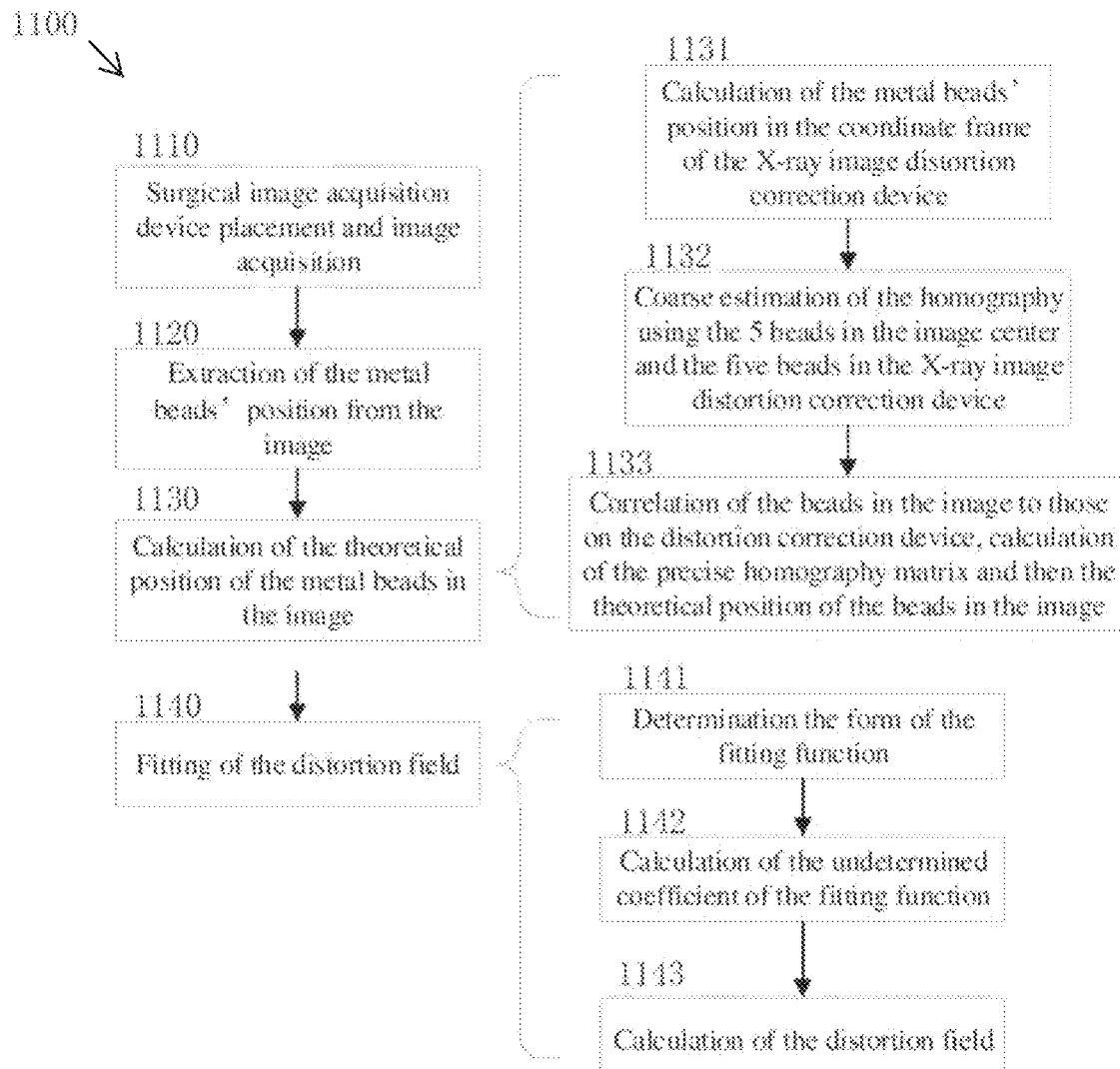
FIG. 20 is a flow chart showing the steps of an embodiment of an image distortion correction process.

FIG. 20 is a block diagram of exemplary method 1100 for the image distortion correction in step 1001 of the above embodiment.

In step 1110, the surgical image acquisition device 200 is positioned to the first view angle according to the requirement of the specific surgery and an X-ray image is acquired.

In step 1120 the positions of the metal beads embedded in the said X-ray image distortion correction device are extracted and expressed as pixel coordinates, where N metal beads that are extracted are denoted by $P_1, P_2, \ldots, P_N$, respectively.

In step 1130, the theoretical position of the metal beads in the undistorted image is calculated according to the following substeps:

In substep 1131, according to the predefined configuration of the metal beads embedded in the X-ray image distortion correction device, their coordinates in the coordinate frame of the X-ray image distortion correction device are calculated and are denoted by $Q_1, Q_2, \ldots, Q_M$, respectively.

In substep 1132, among $P_1, P_2, \ldots, P_N$, the point closest to the center of the image and the four nearest points to this center point are denoted by $P_{N_1}, P_{N_2}, P_{N_3}, P_{N_4}, P_{N_5}$, respectively. Similarly, among $Q_1, Q_2, \ldots, Q_M$, the point closest to the center of the X-ray image distortion correction device and the four nearest points to this center point are denoted by $Q_{M_1}, Q_{M_2}, Q_{M_3}, Q_{M_4}, Q_{M_5}$ respectively. According to the correspondent relationship between $P_{N_1}, P_{N_2}, P_{N_3}, P_{N_4}, P_{N_5}$ and $Q_{M_1}, Q_{M_2}, Q_{M_3}, Q_{M_4}, Q_{M_5}$, a homography matrix $H_0$ can be calculated.

In substep 1133, according to the homography matrix $H_0$, the theoretical positions on the X-ray image distortion correction device corresponding to $P_1, P_2, \ldots, P_N$ are calculated and denoted by $\tilde{Q}_1, \tilde{Q}_2, \ldots, \tilde{Q}_N$. Then $\tilde{Q}_1, \tilde{Q}_2, \ldots, \tilde{Q}_N$ are assigned to their nearest points among $Q_1, Q_2, \ldots, Q_M$ so that the coordinates of the metal beads on the X-ray image distortion correction device corresponding to the coordinates $P_1, P_2, \ldots, P_N$ on the image are obtained and denoted by $Q_{I_1}, Q_{I_2}, \ldots, Q_{I_N}$. According to the correspondent relationship between $P_1, P_2, \ldots, P_N$ and $Q_{I_1}, Q_{I_2}, \ldots, Q_{I_N}$, a more precise homography matrix H can be calculated. According to H and $Q_{I_1}, Q_{I_2}, \ldots, Q_{I_N}$ the theoretical position of $P_1, P_2, \ldots, P_N$ in the undistorted image is obtained and denoted by $\tilde{P}_1, \tilde{P}_2, \ldots, \tilde{P}_N$.

In step 1140, according to the positions of the metal beads in the distorted image $P_1, P_2, \ldots, P_N$ and in the undistorted image $\tilde{P}_1, \tilde{P}_2, \ldots, \tilde{P}_N$, the distortion field is calculated according to the following substeps:

In substep 1141, the form of the fitting function $f(P,\theta)$ of the distortion field is determined, including but not limited to polynomials, trigonometric functions and piecewise splines, wherein $f(P,\theta)$ is the coordinates in the distorted image corresponding to a point P in the undistorted image and θ is the undetermined coefficient of the fitting function.

In substep 1142, the optimal value of the undetermined coefficient θ is calculated by minimizing the target function $$\sum_{i=1}^{N} \left\| \tilde{P}_i - f(P_i, \theta) \right\|^2$$

using gradient descent method, thus the fitting function $f(P,\theta)$ is determined, where $\tilde{P}_i$ are the coordinates of the beads in the distorted image and $P_i$ are the coordinates of the beads in the undistorted image.

In substep 1143, according to the fitting function $f(P,\theta)$, the difference between the coordinates in the distorted and undistorted images of every pixel in the image is calculated, thus the distortion field of the whole image is obtained.

Then step 1110 to 1140 is repeated with the image taken from the second view angle according to the requirement of the specific surgery, and the distortion field of the image under the second view angle is obtained.

Figure 21:
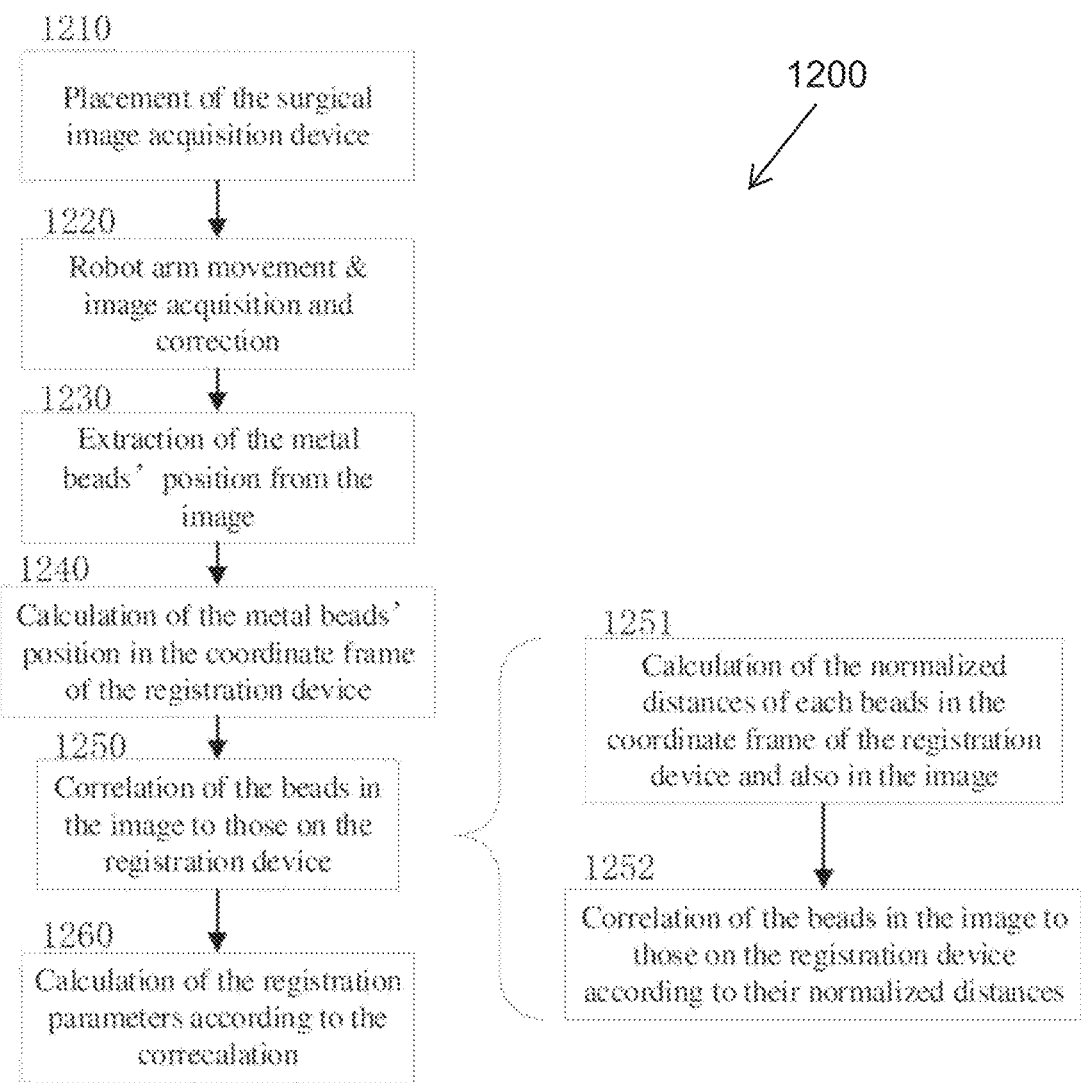
FIG. 21 is a flowchart showing the steps of an embodiment of a registration process.

FIG. 21 is a block diagram of exemplary method 1200 for the registration procedure in step 1002 of the above embodiment.

In step 1210, the surgical image acquisition device is positioned to the first view angle according to the requirement of the specific surgery.

In step 1220, the robot arm is moved to a proper position where the attached registration device is in the field of view of the surgical image acquisition device, and then an X-ray image is acquired and its distortion is corrected.

In step 1230, the positions of the metal beads in the corrected image obtained in step 1220 are extracted, in which the coordinates of the four bigger metal beads are denoted by $A_1, A_2, A_3, A_4$ and the coordinates of the four smaller metal beads are denoted by $A_5, A_6, A_7, A_8$.

In step 1240, according to the current pose of the robot arm, the position of the metal beads embedded in the registration device in the robot arm coordinate frame is calculated, in which the coordinate of the four bigger metal beads are denoted by $C_1, C_2, C_3, C_4$ and the coordinates of the four smaller metal beads are denoted by $C_5, C_6, C_7, C_8$.

In step 1250, the positions of the metal beads in the robot arm coordinate frame are correlated to their positions in the X-ray image, according to the following substeps:

In substep 1251, the normalized distances of each beads on the registration device are calculated. Consider the four bigger metal beads in the image, as they make up the vertices of a convex polygon, without loss of generality, we can assume that $A_1, A_2, A_3, A_4$ are clockwise or counter-clockwise arranged. The line between $A_1$ and $A_3$, and the line between $A_2$ and $A_4$ are crossed at point B (point 13 in FIG. 5), and the normalized distances from $(A_1,A_2,A_3,A_4)$ to B is calculated as $$l_1 = \frac{\|A_1 - B\|}{\|A_1 - A_3\|}, \quad l_2 = \frac{\|A_2 - B\|}{\|A_2 - A_4\|}, \quad l_3 = \frac{\|A_3 - B\|}{\|A_1 - A_3\|}, \quad l_4 = \frac{\|A_4 - B\|}{\|A_1 - A_3\|} \qquad \text{a)}$$

similarly, in the robot arm coordinate frame, the normalized distances $d_1$, $d_2$, $d_3$, $d_4$ of the four bigger metal beads can be calculated according to their coordinates $C_1$, $C_2$, $C_3$, $C_4$.

In substep 1252, the bead in the image and those on the registration device are correlated according to their normalized distances. For a certain metal bead, the normalized distance calculated using the coordinate in the robot arm coordinate frame and the one using the coordinate in the X-ray image should be approximately equal, and the normalized distances of the four bigger metal beads are different from each other, therefore the positions of the metal beads in the robot arm coordinate frame can be correlated to those in the X-ray image by correlating $l_1$, $l_2$, $l_3$, $l_4$ to the ones with the closest value among $d_1$, $d_2$, $d_3$, $d_4$, with the coordinates of the metal beads in the X-ray image corresponding to $C_1$, $C_2$, $C_3$, $C_4$ being denoted by $A_{r_1}$, $A_{r_2}$, $A_{r_3}$, $A_{r_4}$. Similarly the coordinates of the four smaller metal beads in the X-ray image corresponding to $C_5$, $C_6$, $C_7$, $C_8$ can be determined and denoted by $A_{r_5}$, $A_{r_6}$, $A_{r_7}$, $A_{r_8}$.

In step 1260, according to the correspondent relationship between $C_1$, $C_2$, ..., $C_8$ and $A_{r_1}$, $A_{r_2}$, ..., $A_{r_8}$, the imaging model parameters and the spatial position relative to the robot arm of the surgical image acquisition device from the current view angle can be calculated using the Faugeras method (Faugeras OD, The calibration problem for stereo, Proc CVPR Miami Beach Fl, 1986, 42(12):195-213), which are further refined using the gradient descent method. The imaging model parameters are described using the intrinsic matrix $A_1$, the spatial position relative to the robot arm is described using the rotation matrix $R_1$ and the translation vector $t_1$.

The surgical image acquisition device is positioned to the second view angle according to the requirement of the specific surgery, and step 1220 to step 1260 are repeated to obtain the imaging model parameters and the spatial position relative to the robot arm of the surgical image acquisition device from the second view angle, wherein the said imaging model parameters are described using the intrinsic matrix $A_2$, the spatial position relative to the robot arm is described using the rotation matrix $R_2$ and the translation vector $t_2$.

Figure 22:
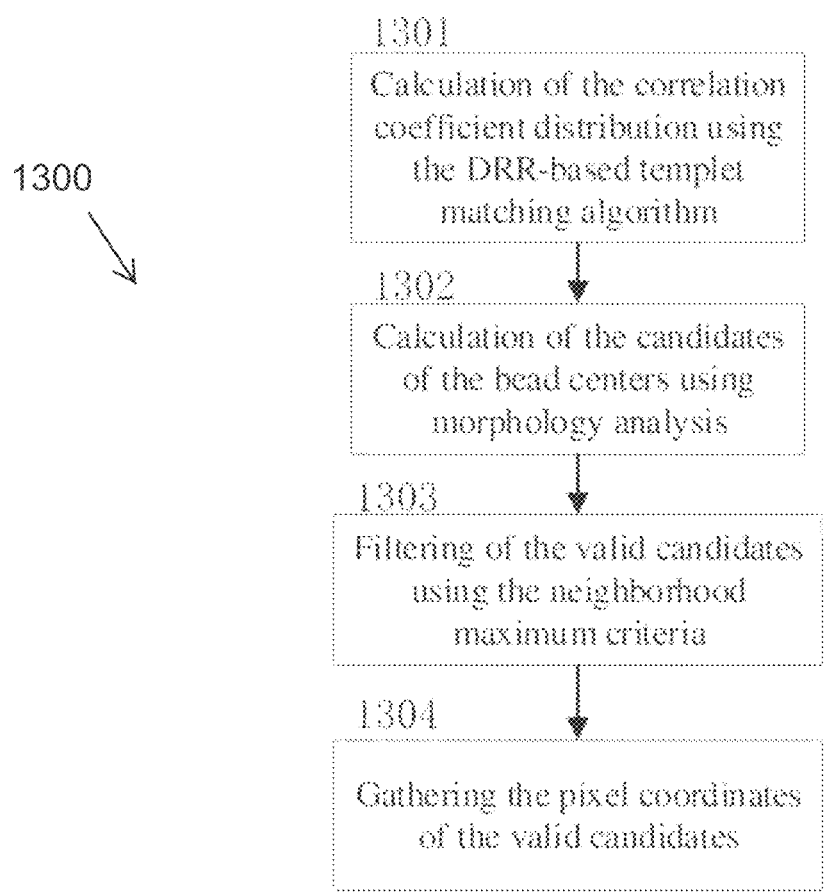
FIG. 22 is a flow chart showing the steps of a process for the extraction of the position of the metal beads embedded in the X-ray distortion correction device and the registration device.

FIG. 22 is a block diagram of exemplary method 1300 for the extraction of the position of the metal beads embedded in the X-ray distortion correction device and the registration device. This method is based on the image processing algorithms including digitally reconstructed radiograph (DRR) based template matching and morphology analysis.

In step 1301, the distribution of the correlation coefficient between the image and the DRR template among the image is acquired using the DRR-based template matching algorithm (Uneri A, Silva T D, Stayman J W, et al. Known-component 3D-2D registration for quality assurance of spine surgery pedicle screw placement. Physics in Medicine & Biology, 2015, 60(20):8007.).

In step 1302, the connected regions made up of pixels with a correlation coefficient higher than a certain threshold Z1 are selected, and the centroids of these regions with an area larger than a certain threshold Z2 are chosen as the candidates of the metal beads' centers.

In step 1303, for a circular region, whose center is one of the candidates obtained in the step 1302 and with a radius of a certain threshold Z3, if there are no other candidates in the said region, or the center candidate has the larger correlation coefficient than any other candidates in this area, the center candidate is regarded as a valid candidate.

In step 1304, the pixel coordinates of all the valid candidates among the candidates obtained in step 1302 according to the criteria in step 1303 are the positions of the metal beads embedded in the X-ray distortion correction device and the registration device to be extracted.

In step 1004 of the above embodiment, the planned drilling path in the images is described with the pixel coordinates of the entry points in both images which are denoted by $s_1^{req}$ and $s_2^{req}$, and the direction vectors of the drilling path in both images which are denoted by $n_1^{req}$ and $n_2^{req}$. In step 1006 of the above embodiment, the position and direction of the surgical tool, i.e. the instrument as said, in the images are extracted using image processing algorithms including adaptive binarization, edge detection, Hough transformation, morphology analysis, etc. (Westphal R, Winkelbach S, Wahl F, et al. Robot-assisted long bone fracture reduction. The International Journal of Robotics Research, 2009, 28(10): 1259-1278.) The result is represented using the pixel coordinates of the tip of the surgical tool in both images which are denoted by $s_1^{mez}$ and $s_2^{mez}$, and the direction of the axis of the surgical tool in both images which are denoted by $n_1^{mez}$ and $n_2^{mez}$.

In step 1005 of the above embodiment, the said position-based control method includes the following steps:

a) According to the registration parameters $A_1$, $A_2$, $R_1$, $R_2$, $t_1$ and $t_2$ obtained in step 1002 of the above embodiment, and the drilling path assigned by the surgeon on the images in step 1004, the position and orientation of the drilling path in the robot arm coordinate frame are calculated, where the position of the drilling path is described by the coordinates of the entry point of the drilling path in the robot arm coordinate frame and is denoted by $x_W^{req}$, and the orientation of the drilling path is described by the direction vector along the drilling path in the robot arm coordinate frame and is denoted by $n_W^{req}$.

b) According to the current pose and the forward kinematics of the robot arm, the position and orientation of the surgical tool in the robot arm coordinate frame are calculated, where the position of the surgical tool is described by the coordinates of its tip in the robot arm coordinate frame and is denoted by $x_W^{mez}$, and the orientation of the surgical tool is described by the direction vector along the surgical tool in the robot arm coordinate frame and is denoted by $n_W^{mez}$.

c) The motion quantity of the robot arm is calculate using the position and orientation of the drilling path and the surgical tool obtained in a) and b) respectively.

In step 1006 of the above embodiment, the said image feedback control method includes the following steps:

b) According to the registration parameters $A_1$, $A_2$, $R_1$, $R_2$, $t_1$ and $t_2$ obtained in step 1002 of the above embodiment, and the drilling path assigned by the surgeon on the images in step 1004, the position and orientation of the drilling path in the robot arm coordinate frame are calculated, where the position of the drilling path is described by the coordinates of the entry point of the drilling path in the robot arm coordinate frame and is denoted by $x_W^{req}$, and the orientation of the drilling path is described by the direction vector along the drilling path in the robot arm coordinate frame and is denoted by $n_W^{req}$.

c) According to the registration parameters $A_1$, $A_2$, $R_1$, $R_2$, $t_1$ and $t_2$ obtained in step 1002 of the above embodiment, and the position and direction of the surgical tool in the images extracted in step 1006 of the above embodiment, the position and orientation of the surgical tool in the robot arm coordinate frame are calculated, where the position of the surgical tool is described by the coordinates of its tip in the robot arm coordinate frame and is denoted by $x_W^{mez}$, and the orientation of the surgical tool is described by the direction vector along the surgical tool in the robot arm coordinate frame and is denoted by $n_W^{mez}$;

d) The motion quantity of the robot arm is calculate using the position and orientation of the drilling path and the surgical tool obtained in a) and b) respectively.

In the above embodiment, the difference between the position-based control method in step 1005 and the image feedback control method in step 1006 is that the position and orientation of the surgical tool in the robot arm coordinate frame is calculated using different methods. In the position-based control method, the position and orientation of the surgical tool is calculated according to the current pose of the robot arm, while in the image feedback method it is calculated based on the position and orientation of the surgical tool in the X-ray images and the registration parameters of the surgical image acquisition device. Since in the image feedback control method, the spatial positions and orientations of both the drilling path and the surgical tool are calculated based on the same X-ray images, the registration error and the robot arm modeling error can be compensated.

In the above embodiment, given the position and direction of the drilling path/surgical tool in the images, the position and direction of the drilling path/surgical tool in the robot arm coordinate system are calculated according to the following methods:

In the following equations, the position and direction of the drilling path (or the surgical tool) in the images are described using the pixel coordinates of the entry point of the drilling path (or the tip of the surgical tool) in both images which are denoted by $s_1$ and $s_2$, and the direction vectors of the drilling path (or the tip of the surgical tool) in both images which are denoted by $n_1$ and $n_2$.

a) The position of the entry point of the drilling path (or the tip of the surgical tool) which is denoted by $x_W$ is calculated by solving the following linear equation:

$$\begin{bmatrix} V_1 R_1 \\ V_2 R_2 \end{bmatrix} x_w = -\begin{bmatrix} V_1 t_1 \\ V_2 t_2 \end{bmatrix}$$

wherein $V_1 = A_1 - [0\ 0\ s_1]$, $V_2 = A_2 - [0\ 0\ s_2]$ b) The direction of the drilling path (or the surgical tool) which is denoted by $n_W$ is calculated according to:

$$n_w = \frac{(R_1^T n_1^C) \times (R_2^T n_2^C)}{\|(R_1^T n_1^C) \times (R_2^T n_2^C)\|}$$

wherein $$n_1^C = \begin{bmatrix} (n_1)_2 (a_1)_{11} \\ (n_1)_2 (a_1)_{12} - (n_1)_1 (a_1)_{22} \\ (n_1)_2 ((a_1)_{13} - (s_1)_1) - (n_1)_1 ((a_1)_{23} - (s_1)_2) \end{bmatrix}$$

$$n_2^C = \begin{bmatrix} (n_2)_2 (a_2)_{11} \\ (n_2)_2 (a_2)_{12} - (n_2)_1 (a_2)_{22} \\ (n_2)_2 ((a_2)_{13} - (s_2)_1) - (n_2)_1 ((a_2)_{23} - (s_2)_2) \end{bmatrix}$$

$(n_i)_j$ denotes the $j^{th}$ component of $n_i$, $(s_i)_j$ denotes the $j^{th}$ component of $s_i$ and $(a_i)_{jk}$ denotes the component on row j and column k of $A_i$.

In the above embodiment, given the position and orientation of the drilling path denoted by $x_W^{req}$ and $n_W^{req}$ in the robot arm coordinate frame, and the position and orientation of the surgical tool denoted by $x_W^{mez}$ and $n_W^{mez}$ in the robot arm coordinate frame, the motion quantity of the robot arm is calculated according to the following methods:

a) The quantity of rotation $r_W$ is calculated according to:

$$r_w = \frac{\bar{r}_w}{\|\bar{r}_w\| \sin^{-1}(\|\bar{r}_w\|)}$$

wherein $\bar{r}_W = n_W^{mez} \times n_W^{req} \mathrm{sgn}(n_W^{mez} \cdot n_W^{req})$. The direction of $r_W$ represents the rotation axis of the rotation quantity, and the norm of $r_W$ represents the rotation angle;

b) The quantity of translation $d_W$ is calculated according to $$d_W = \bar{x}_W - x_W^{mez}$$

wherein $\bar{x}_W$ is calculated by solving the following linear equation $$\begin{bmatrix} (m_1^{req})^T R_1 \\ (m_2^{req})^T R_2 \\ (n_w^{req})^T \end{bmatrix} \bar{x}_w = \begin{bmatrix} -(m_1^{req})^T t_1 \\ -(m_2^{req})^T t_2 \\ (n_w^{req})^T x_w^{mez} \end{bmatrix}$$

Wherein $$m_1^{req} = \begin{bmatrix} (n_1^{req})_2 (a_1)_{11} \\ (n_1^{req})_2 (a_1)_{12} - (n_1^{req})_1 (a_1)_{22} \\ (n_1^{req})_2 ((a_1)_{13} - (s_1^{req})_1) - (n_1^{req})_1 ((a_1)_{23} - (s_1^{req})_2) \end{bmatrix}$$

$$m_2^{req} = \begin{bmatrix} (n_2^{req})_2 (a_2)_{11} \\ (n_2^{req})_2 (a_2)_{12} - (n_2^{req})_1 (a_2)_{22} \\ (n_2^{req})_2 ((a_2)_{13} - (s_2^{req})_1) - (n_2^{req})_1 ((a_2)_{23} - (s_2^{req})_2) \end{bmatrix}$$

$(n_i^{req})$ denotes the $j^{th}$ component of $n_i^{req}$, $(s_i^{req})_j$ denotes the $j^{th}$ component of $s_i^{req}$ and $(a_i)_{jk}$ denotes the component on row j and column k of $A_i$. The foregoing algorithm can compensate for registration errors in the present surgical robot system.

Figure 6:
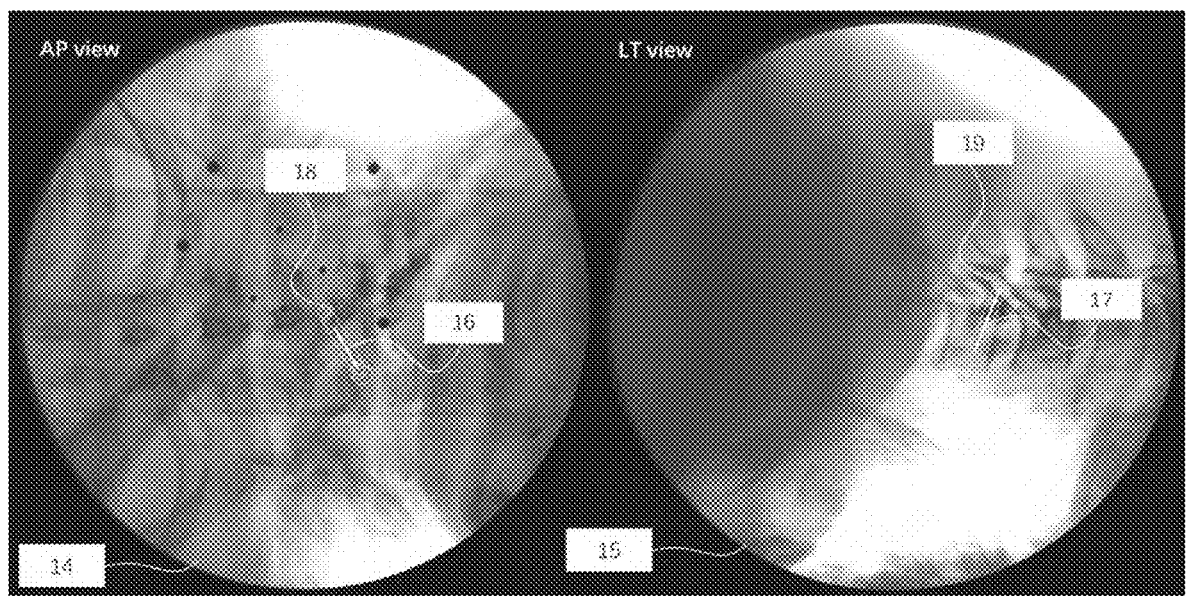
FIG. 6 is an image of a graphical user interface of showing X-ray images used to plan a drilling path.
Figure 7:
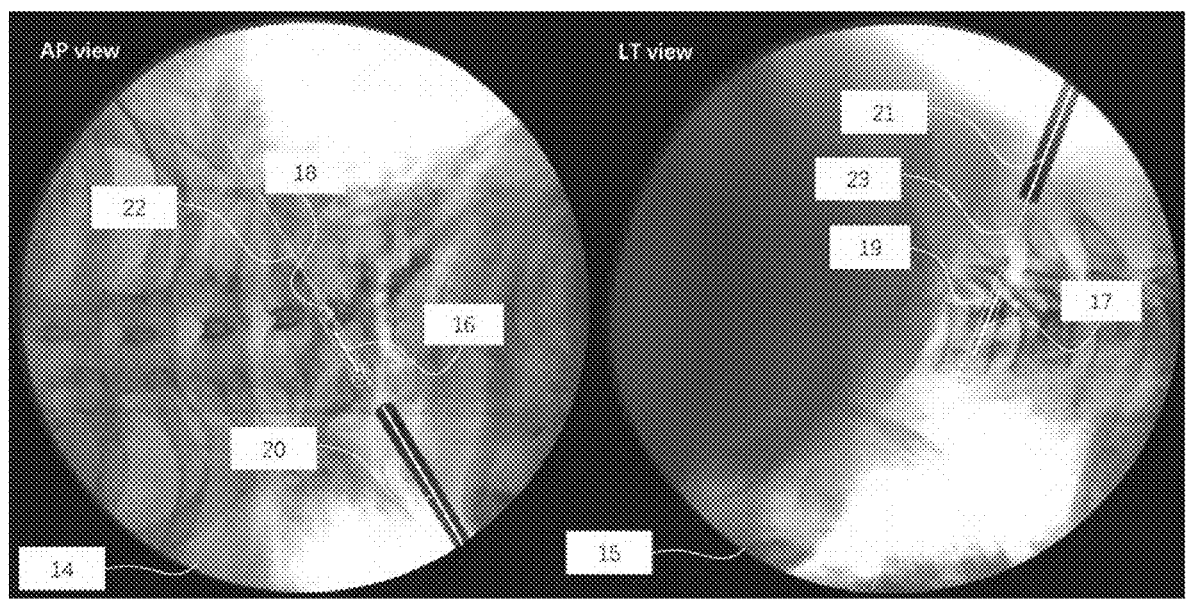
FIG. 7 is an image of a graphical user interface of showing X-ray images of a drilling path and a surgical tool.

In step 1004 of the above embodiment, an example of the planned drilling path on the graphical user interface is shown in FIGS. 6 and 7 are two X-ray images acquired from the two angles according to the specific surgery requirement and in this example image 14 is acquired from the antero-posterior view (AP view) and image 15 is acquired from the lateral view (LT view). The line segments 16 and 17 indicate the position and direction of the drilling path in each image, which are assigned by the surgeon. For a screw placement operation, the graphical user interface can also superimpose the outlines of the screw to both images according to the drill path, which is assigned by the surgeon, and screw's length and diameter. 18 and 19 show an example of the outline of the screw to be placed.

In step 1006 of the above embodiment, an example of the surgical images with a surgical tool in the field of view is shown in FIG. 7. In this example a drill guide is approaching the desired drilling path. Items 20 and 21 are the automatically extracted axes of the surgical tool in the images, and items 22 and 23 are the extension lines of 20 and 21. The positioning error can be calculated using the relative position and angle between 16, 17 and 21, 23.

The benefits of the present invention include that operations can be performed according to surgeons' conventional way of thinking. It visualizes the path planning process inside a surgeon's mind on a GUI that shows two images taken by a surgical image acquisition device from two different viewpoints. The GUI provides spatial relative position information of a surgical tool on these two images, with which surgeons can work out a path for the entrance of a surgical tool to the assigned position inside a subject's body in the same way that they would do if operating manually, without robotic assistance. By using the present system, a surgeon's experience in drill path planning is also digitally recorded for later machines to learn from and realize intelligent path planning.

In the proposed invention, a two-stage control strategy is used, in which a fine adjustment is performed according to the relative position between the drilling path and the surgical tools in the X-ray images after the coarse positioning in the first stage. In this way the error caused by registration and body movement is compensated. The proposed invention has good versatilities for drilling tasks. It provides both an automatic drilling mode and manual drilling mode to meet the needs of different surgeries. Since the drilling process is monitored by a force sensor, the surgeons can also manually abort the drilling process through the GUI, which ensures safety for surgery.

The proposed invention also has lower hardware requirements compared with the existing products. The said surgical image acquisition device, such as C-arm or G-arm X-ray machine, used in common operation room can be directly used in the system without any further modification. Besides, the image feedback control method provided by this invention doesn't rely on the 3D image information or the optical navigation systems, thus the cost for CT scan and optical navigation system is saved. Furthermore, this invention provides a device and a method for image distortion correction hence the low-end image acquisition device with severe image distortion can be also easily used in the system provided by this invention.

EXAMPLE

In one embodiment, a surgical procedure can be performed as follows:

1) The X-ray image distortion correction device is mounted on the surgical image acquisition device and the distortion is corrected under the two view angles determined by the specific surgery requirement respectively, and then the X-ray image distortion correction device is unmounted.

2) The registration device is attached to the end of the said robot arm. Then the registration procedures are conducted under the two view angles mentioned in step 1) to acquire the parameters of the imaging model of the surgical image acquisition device and also its spatial relationship with respect to the robot arm, and then the registration device is detached from the robot arm.

3) The automatic drilling mode or the manual drilling mode is selected according to the surgery requirement. In the automatic drilling mode, an electric drill is attached to the end of the robot arm. In the manual drilling mode, a drill guide is attached to the end of the robot arm.

4) The surgeon plans the drilling path on the images acquired from the view angles mentioned in step 1) through the graphical user interface (GUI) on the said remote operation workstation.

5) According to the drilling path planned in step 4), the remote operation workstation calculates the robot motion quantity using the position-based control method and controls the robot arm to move accordingly.

6) A new X-ray image is acquired from the two view angles mentioned in step 1) respectively, and the position and orientation of the surgical tool (such as the drill guide, the drill, the guidewire or the puncture needle) in both images are extracted automatically with the image processing algorithms and shown in the graphical user interface. The positioning error is calculated automatically according to the relative position and angle between the drilling path and the surgical tool in the images. If the positioning error satisfies the surgery requirement, the positioning procedure is finished, otherwise the remote operation workstation calculates the motion quantity using the image feedback control method and controls the robot arm to make further fine adjustments to finish the positioning procedure.

7) For automatic drilling mode, the electric drill spins and move along the drilling path driven by the robot arm. The depth and speed of the drilling operation is assigned by the surgeon through the graphical user interface on the remote operation workstation. During the drilling procedure, the surgeon can pause the operation and repeat the fine adjustment mentioned in step 6) to correct the potential error caused by the drilling operation and increase the drilling accuracy. The drilling procedure is monitored by the said force sensor and the electric drill stops spinning if abnormal force signals are detected. For manual drilling mode, the surgeon manually performs the drilling operation guided by the drill guide attached to the end of the robot arm.

The examples set forth herein are provided to illustrate certain concepts of the disclosure. The apparatus, devices, or components illustrated above may be configured to perform one or more of the methods, features, or steps described herein, and the various features and processes described above may be used independently of one another, or may be combined in various ways. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced in different ways than those set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be stored in software or firmware and implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Software or firmware may be stored computer readable or machine readable medium having stored thereon computer executable instructions that when executed by a computer (e.g., a processor) control the computer to perform the functionality described herein. Examples of machine readable media suitable for implementing the subject matter described herein include non-transitory computer-readable media, such as disk memory devices, chip memory devices, programmable logic devices, and application specific integrated circuits. In addition, a machine readable medium that implements the subject matter described herein may be located on a single device or computing platform or may be distributed across multiple devices or computing platforms.

What is claimed is:

1. A method for performing a surgical drilling operation on a surgical subject with a surgical robot system without trackers or markers, wherein the surgical robot system comprises a robot arm, a surgical tool, an X-ray image acquisition device, a registration device mounted on a mechanical interface at a distal end of the robot arm for realizing registration between the surgical tool and the image acquisition device, a computer, and a display, wherein the surgical tool is an electric drill for automatic drilling mode or a drill guide for manual drilling mode, comprising the steps of:
   (a) obtaining an image distortion correction data matrix with an image distortion correction device by:
      (i) mounting an X-ray image distortion correction device on the X-ray image acquisition device of the robotic surgery system, wherein the image distortion correction device comprises a piece of material which is transparent to X-rays in which an array of beads made from a material opaque to X-rays has been arranged in a planar array;
      (ii) obtaining at least one first X-ray image with the X-ray image acquisition device in a first position, wherein a difference between coordinates of every pixel in the first X-ray image is calculated with reference to image distortion information provided by the image distortion correction device and a distortion field of the first X-ray image in the first position is obtained as a first image correction data matrix in which each element of the first image correction data matrix corresponds to one pixel in the X-ray image;
      (iii) obtaining at least one second X-ray image with the X-ray image acquisition device in a second position, wherein the second position is a different position than the first position, wherein a difference between coordinates of every pixel in the second X-ray image is calculated with reference to the image distortion information provided by the image distortion correction device and a distortion field of the second X-ray image in the second position is obtained as a second image correction data matrix in which each element of the second image correction data matrix corresponds to one pixel in the X-ray image;
      (iv) (iv) unmounting the X-ray image distortion correction device from the X-ray image acquisition device; and
      (v) the first and second image correction data matrices obtained in the first and the second positions are averaged to form a third image correction data matrix that is used in following steps, where all obtained X-ray images are corrected by multiplying a respective X-ray image data matrix with the third image correction data matrix;
   (b) realizing registration between the surgical tool and the image acquisition device by:
      (i) attaching the registration device to the distal end of the robot arm together with the surgical tool, wherein the registration device comprises a piece of material which is transparent to X-rays, and wherein at least 8 beads made from a material opaque to X-rays have been positioned in the registration device in a predetermined arrangement;
      (ii) obtaining at least two registration X-ray images of the registration device with the X-ray image acquisition device and surgical tool; and
      (iii) detaching the registration device from the robot arm;
   (c) determining a path to be taken by the surgical tool using the registration images, then moving the robot according to the determined path in order to perform the surgical drilling operation,
   (d) after moving the robot for a distance, determining positioning error by acquiring additional X-ray images from the first position and the second position and extracting position and orientation of the surgical tool in the additional X-ray images, positioning error being calculated according to a relative position and angle between the path and the surgical tool in the additional X-ray images, and if the positioning error is within predetermined limits, moving the surgical tool with the robot along the path, otherwise planning the path again with the additional X-ray images;
   (e) in the automatic drilling mode, obtaining force signals, and when the electric drill is spinning, stopping the drilling if abnormal force signals are detected by a force sensor, obtaining monitoring X-ray images of the surgical tool with the X-ray image acquisition device and calculating a positioning error as in step (d) for the surgical tool in the a surgical tool image, and if the positioning error is within predetermined limits, then continuing drilling,
   wherein position and orientation of the surgical tool are determined from X-ray images obtained by the X-ray image acquisition, and wherein markers and trackers are not attached to the surgical subject.

2. The method of claim 1, wherein a positioning error includes translational error and rotational error, and wherein:
   the translational error is defined as the root mean square of the distances between a distal end of the surgical tool and spatial coordinates corresponding to the predetermined path along which the surgical tool is moved by the robot arm in both X-ray images;
   the rotational error is defined as the root mean square of angles between longitudinal axes of the surgical tool and spatial coordinates corresponding to the predetermined path along which the surgical tool is moved by the robot arm in both X-ray images.

3. The method of claim 1, wherein the surgical tool is a drill guide or an electric drill.

4. The method of claim 1, wherein the material opaque to X-rays comprises beads arranged in a grid of perpendicular rows, and wherein correcting image distortion in the X-ray images comprises:
   determining positions of the beads in one of the distorted images; and
   calculating a distortion field according to positions of the beads in an undistorted image and positions of the beads in the distorted image; and
   recovering the undistorted image with the calculated distortion field.

5. The method of claim 1, wherein a distortion field is described using a fitting function $f(P,\theta)$, wherein $f(P,\theta)$ defines coordinates in the distorted image corresponding to a point P in the undistorted image, and wherein an undetermined coefficient θ of the fitting function is calculated by minimizing a target function $$\sum_{i=1}^{N}\|\tilde{P}_i - f(P_i, \theta)\|^2$$

using a gradient descent method, $\tilde{P}_i$ wherein are the coordinates of the beads in the distorted image and $P_i$ are the coordinates of the beads in the undistorted image.

6. The method of claim 1, wherein a fitting function is selected from the group consisting of polynomials, trigonometric functions, and piecewise splines.

7. The method of claim 1, wherein the X-ray image acquisition device is a C-arm X-ray machine or G-arm X-ray machine.

\* \* \* \* \*